United States Patent
Uchiyama et al.

(10) Patent No.: US 10,823,560 B2
(45) Date of Patent: Nov. 3, 2020

(54) TILT SENSOR

(71) Applicant: SEIKO INSTRUMENTS INC., Chiba-shi, Chiba (JP)

(72) Inventors: Takeshi Uchiyama, Chiba (JP); Manabu Oumi, Chiba (JP); Yoko Shinohara, Chiba (JP); Masayuki Suda, Chiba (JP); Ayako Nobe, Chiba (JP); Yoshiyuki Kaiho, Chiba (JP)

(73) Assignee: SEIKO INSTRUMENTS INC., Chiba-shi (JP)

( * ) Notice: Subject to any disclaimer, the term of this patent is extended or adjusted under 35 U.S.C. 154(b) by 339 days.

(21) Appl. No.: 15/752,176

(22) PCT Filed: Aug. 10, 2016

(86) PCT No.: PCT/JP2016/073577
§ 371 (c)(1),
(2) Date: Feb. 12, 2018

(87) PCT Pub. No.: WO2017/038420
PCT Pub. Date: Mar. 9, 2017

(65) Prior Publication Data
US 2018/0238685 A1  Aug. 23, 2018

(30) Foreign Application Priority Data

Sep. 2, 2015   (JP) ................................. 2015-173114

(51) Int. Cl.
*G01C 9/06* (2006.01)
*G01C 9/00* (2006.01)
(Continued)

(52) U.S. Cl.
CPC ................. *G01C 9/06* (2013.01); *G01C 5/06* (2013.01); *G01C 9/00* (2013.01); *G01L 9/04* (2013.01)

(58) Field of Classification Search
CPC ........... G01C 5/06; G01C 19/56; G01C 9/00; G01C 9/06; G01L 9/0002; G01L 13/02;
(Continued)

(56) References Cited

U.S. PATENT DOCUMENTS 7,394,138 B2 * 7/2008 Katou ................. G01P 15/0802
257/414
8,113,062 B2 * 2/2012 Graboi .............. A61M 16/0875
73/861

(Continued)

FOREIGN PATENT DOCUMENTS

JP   H06-221851 A    8/1994
JP   2006-292443 A   10/2006
(Continued)

OTHER PUBLICATIONS

Oct. 30, 2018 Office Action issued in Japanese Patent Application No. 2017-537704.
(Continued)

*Primary Examiner* — Yaritza Guadalupe-McCall
(74) *Attorney, Agent, or Firm* — Oliff PLC

(57) ABSTRACT

A tilt sensor includes: a pressure sensor disposed to be relatively movable with respect to a detection target object and configured to detect pressure of a fluid; and a tilt information detection unit configured to detect tilt information (for example, a tilt angle) of the detection target object according to an output of the pressure sensor and movement information of the pressure sensor.

12 Claims, 12 Drawing Sheets

(51) Int. Cl.
  *G01C 5/06* (2006.01)
  *G01L 9/04* (2006.01)
(58) Field of Classification Search
  CPC ..... G01L 9/0019; G01L 9/0052; G01L 13/06;
    G01L 23/10; G01L 23/18; G01L 7/00;
    G01L 7/02; G01L 19/0038
  USPC .......................................................... 33/1 N
  See application file for complete search history.

(56) References Cited

U.S. PATENT DOCUMENTS

| | | | | |
|---|---|---|---|---|
| 2003/0182040 | A1* | 9/2003 | Davidson | A41D 13/018 |
| | | | | 701/45 |
| 2010/0077866 | A1* | 4/2010 | Graboi | A61M 16/0875 |
| | | | | 73/861.61 |
| 2013/0041610 | A1* | 2/2013 | Waters | G01C 17/02 |
| | | | | 702/93 |
| 2015/0153171 | A1* | 6/2015 | Zhou | G01C 5/06 |
| | | | | 702/138 |
| 2018/0238685 | A1* | 8/2018 | Uchiyama | G01C 9/06 |
| 2018/0372524 | A1* | 12/2018 | Saville | A45F 3/04 |
| 2019/0234989 | A1* | 8/2019 | Na | G01D 21/02 |
| 2019/0285663 | A1* | 9/2019 | Chino | G01C 21/16 |

FOREIGN PATENT DOCUMENTS

| | | |
|---|---|---|
| JP | 2010-261798 A | 11/2010 |
| JP | 5424224 B2 | 2/2014 |
| JP | 2015-028489 A | 2/2015 |

OTHER PUBLICATIONS

Nov. 8, 2016 International Search Report issued in International Patent Application No. PCT/JP2016/073577.

* cited by examiner

TILT SENSOR

TECHNICAL FIELD

The present invention relates to a tilt sensor.

Priority is claimed on Japanese Patent Application No. 2015-173114, filed on Sep. 2, 2015, the content of which is incorporated herein by reference.

BACKGROUND ART

Tilt sensors detecting tilt information such as angles or horizontality of detection target objects are known (for example, see Patent Documents 1 to 3). For example, according to technologies disclosed in Patent Documents 1 and 2, tilt angles of objects are detected according to outputs of at least two acceleration sensors mounted on the objects which rotate.

For example, according to a technology disclosed in Patent Document 3, horizontality of a detection target object is detected according to outputs of pressure sensors disposed at least at three positions of the detection target object.

CITATION LIST

Patent Document

[Patent Document 1]
Japanese Unexamined Patent Application, First Publication No. 2015-28489
[Patent Document 2]
Japanese Patent No. 5424224
[Patent Document 3]
Japanese Unexamined Patent Application, First Publication No. 2016-261798

SUMMARY OF INVENTION

Technical Problem

However, in the technologies disclosed in Patent Documents 1 and 2, the acceleration sensors are used such that, for example, it is possible that the detection precision deteriorates due to an influence of acceleration from a motion besides a tilting movement.

In the technology disclosed in Patent Document 3, for example, it is necessary to dispose pressure sensors at least at three positions such that it is possible that the detection precision deteriorates due to variation between the pressure sensors.

Accordingly, it is possible that sufficient detection precision cannot be obtained by the conventional tilt sensors described above, and improvement of detection precision of the tilt information is desired.

The present invention has been made to resolve the foregoing problems and an object of the present invention is to provide a tilt sensor capable of improving detection precision of tilt information.

Solution to Problem

To resolve the foregoing problem, according to an aspect of the present invention, a tilt sensor includes: a pressure sensor disposed to be relatively movable with respect to a detection target object and configured to detect pressure of a fluid; and a tilt information detection unit configured to detect tilt information of the detection target object according to an output of the pressure sensor and movement information of the pressure sensor.

According to another aspect of the present invention, the tilt sensor may further include a movement mechanism configured to move the pressure sensor relative to the detection target object along a predetermined movement path. The tilt information detection unit may detect the tilt information of the detection target object according to the output of the pressure sensor and the movement information of the pressure sensor moved along the predetermined movement path by the movement mechanism.

According to another aspect of the present invention, in the tilt sensor, the movement mechanism may include a rotator on which the pressure sensor is disposed, and the movement mechanism may move the pressure sensor in a circular form by rotating the rotator.

According to another aspect of the present invention, in the tilt sensor, the movement mechanism may include a rotator on which the pressure sensor is disposed, and the movement mechanism may move the pressure sensor in an arc form by rotating the rotator.

According to another aspect of the present invention, in the tilt sensor, the movement mechanism may include a linear mover on which the pressure sensor is disposed and which is capable of moving in a linear form, and the movement mechanism may move the pressure sensor in the linear form by moving the linear mover.

According to another aspect of the present invention, in the tilt sensor, the tilt information detection unit may perform synchronization detection according to a periodic output signal output from the pressure sensor moved along the predetermined movement path and a reference signal which is according to the movement information, and the tilt information detection unit may detect the tilt information of the detection target object according to a result of the synchronization detection.

According to another aspect of the present invention, the tilt sensor may further include a reference signal generation unit configured to generate the reference signal corresponding to a tilt in a predetermined direction according to the movement information. The tilt information detection unit may perform the synchronization detection according to the reference signal generated by the reference signal generation unit and the periodic output signal output from the pressure sensor, and the tilt information detection unit may detect the tilt information of the detection target object in the predetermined direction according to the result of the synchronization detection.

According to another aspect of the present invention, in the tilt sensor, a plurality of pressure sensors may be included. The tilt information detection unit may detect the tilt information of the detection target object according to outputs of the plurality of pressure sensors and the movement information of the pressure sensors.

According to another aspect of the present invention, in the tilt sensor, two of the pressure sensors may be disposed to output periodic output signals with mutually reversed phases due to a predetermined movement. The tilt information detection unit may detect the tilt information of the detection target object according to the two output signals with the mutually reversed phases and the movement information of the pressure sensors.

According to another aspect of the present invention, in the tilt sensor, two of the pressure sensors may be disposed to output periodic output signals with phases mutually deviated by 90 degrees due to a predetermined movement. The tilt information detection unit may detect the tilt information of the detection target object according to the two output signals with the phases deviated by 90 degrees and the movement information of the pressure sensor.

According to another aspect of the present invention, in the tilt sensor, the tilt information detection unit may detect the tilt information of the detection target object according to a movement distance of the pressure sensor and a change in an output value of the pressure sensor with respect to the movement distance.

According to another aspect of the present invention, the tilt sensor may further include a movement information detection unit configured to detect the movement information of the pressure sensor.

Advantageous Effects of Invention

According to an aspect of the present invention, it is possible to improve detection precision of tilt information.

DESCRIPTION OF EMBODIMENTS

Hereinafter, a tilt sensor according to an embodiment of the present invention will be described with reference to the drawings.

First Embodiment

Figure 1:
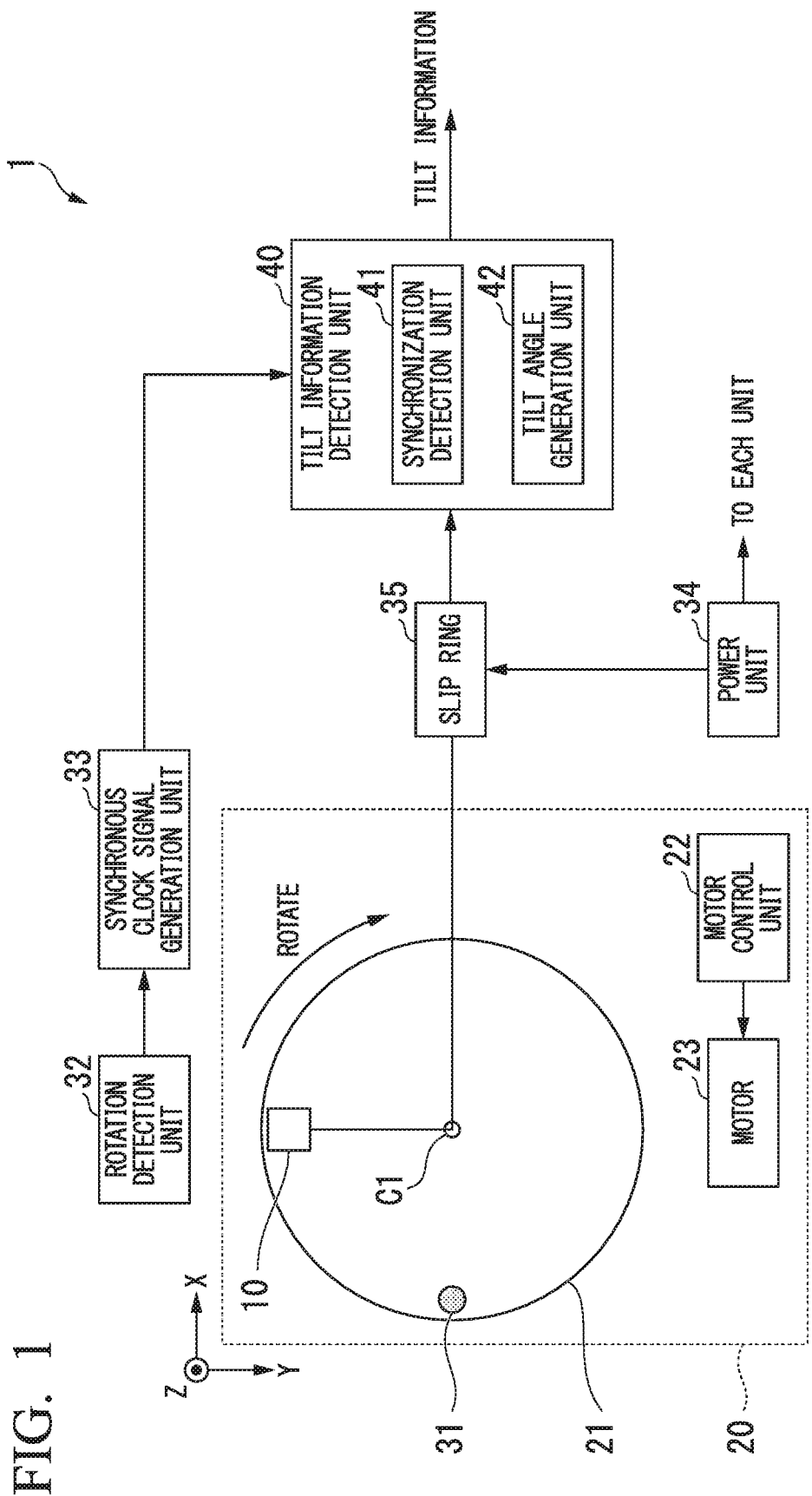
FIG. 1 is a block diagram showing an example of a tilt sensor according to a first embodiment.

FIG. 1 is a block diagram showing an example of a tilt sensor 1 according to a first embodiment.

As shown in FIG. 1, the tilt sensor 1 includes a pressure sensor 10, a movement mechanism 20, a magnet 31, a rotation detection unit 32, a synchronous clock signal generation unit 33, a power unit 34, a slip ring 35, and a tilt information detection unit 40.

According to the present embodiment, an example of the tilt sensor 1 that detects tilt information (for example, a tilt angle) of a detection target object will be described.

The pressure sensor 10 detects, for example, pressure of a fluid such as air or a liquid. The pressure sensor 10 is disposed to be relatively movable with respect to the detection target object. For example, the pressure sensor 10 is disposed in a rotary plate 21 such that the pressure sensor 10 is rotatable in a circular form due to a rotational movement of the rotary plate 21 of the movement mechanism 20 that is described below. The pressure sensor 10 includes, for example, a difference pressure sensor (relative sensor) in which a resistant value is changed through physical deformation by pressure, a Wheatstone circuit which uses the difference pressure sensor as a part of a resistor, and an output amplifier, and the pressure sensor 10 is configured to detect pressure (for example, atmospheric pressure) according to a change in the resistance of the pressure sensor by pressure.

The movement mechanism 20 moves the pressure sensor 10 relative to the detection target object along a predetermined movement path. For example, the movement mechanism 20 moves the pressure sensor 10 in a circular form which is the predetermined movement path. That is, the movement mechanism 20 moves the pressure sensor 10 on the same plane. In FIG. 1, an XYZ rectangular coordinate system is set, a plane on which the pressure sensor 10 moves is set as the XY plane, and an orthogonal direction of the XY plane is set as the Z axis direction. In FIG. 1, the X axis direction is referred to as the horizontal direction of a sheet surface and the Y axis direction is referred to as a vertical direction of the sheet surface.

The movement mechanism 20 includes the rotary plate 21, a motor control unit 22, and a motor 23. The movement mechanism 20 moves the pressure sensor 10 in the circular form by rotating the rotary plate 21.

The pressure sensor 10 and a magnet 31 to be described below are disposed in the rotary plate 21 (an example of a rotator), and the rotary plate 21 is rotated about a rotational axis C1 (central axis) in the Z axis direction at a predetermined rotation speed by the motor 23.

For example, the motor control unit 22 includes a motor driver and the motor control unit 22 controls the motor 23. The motor control unit 22 rotates the rotary plate 21 at a predetermined rotation speed to move the pressure sensor 10 in the circular form.

The motor 23 is connected to the rotary plate 21 via the rotational axis C1 to rotate the rotary plate 21.

The motor 23 is assumed to be fixed to the detection target object.

The magnet 31 is disposed near the circumference of the rotary plate 21, and the magnet 31 is used to detect a rotation position of the pressure sensor 10 (or the rotary plate 21).

The rotation detection unit 32 (which is an example of a movement information detection unit) detects movement information of the pressure sensor 10.

The movement information of the pressure sensor 10 is, for example, information such as a movement position (rotation position), a movement amount, a speed, a direction, and a phase of the pressure sensor 10, and the movement information of the pressure sensor 10 will be described herein as, for example, information (rotation position information) indicating a rotation position of the pressure sensor 10. The rotation detection unit 32 is, for example, a magnetic detection element such as a Hall element, and the rotation detection unit 32 detects a reference position of the rotary plate 21 when the magnet 31 disposed on the rotary plate 21 approaches and outputs a detection signal.

The synchronous clock signal generation unit 33 (an example of a reference signal generation unit) generates a synchronous clock signal (reference signal) corresponding to a tilt in a predetermined direction according to the movement information detected by the rotation detection unit 32. That is, the synchronous clock signal generation unit 33 generates, for example, a synchronous clock signal to synchronously detect a tilt in the X axis direction according to a detection signal output from the rotation detection unit 32 in accordance with the reference position of the rotary plate 21. Specifically, the synchronous clock signal generation unit 33 uses the detection signal output from the rotation detection unit 32 as a trigger to generate a clock signal with the same period as a rotation period of the rotary plate 21. Then, the synchronous clock signal generation unit 33 delays the generated clock signal so that the tilt in the X axis direction is synchronously detected, and the synchronous clock signal generation unit 33 outputs the delayed clock signal as a synchronous clock signal to the tilt information detection unit 40.

The power unit 34 generates a power voltage to operate the tilt sensor 1 and supplies the generated power voltage to each unit. The power unit 34 supplies the power voltage (supply power) to the pressure sensor 10 on the rotary plate 21 via the slip ring 35.

The slip ring 35 is signal transfer means which supply the power voltage (supply power) generated by the power unit 34 to the pressure sensor 10 on the rotary plate 21 which is rotating while transfer an output signal output from the pressure sensor 10 to the tilt information detection unit 40. By using the slip ring 35, the tilt sensor 1 can appropriately transfer the output signal of the pressure sensor 10 disposed on the rotary plate 21 which is rotating to the tilt information detection unit 40.

The tilt information detection unit 40 is a signal processing unit that detects tilt information of the detection target object according to the output of the pressure sensor 10 and the movement information of the pressure sensor 10. That is, the tilt information detection unit 40 detects the tilt information of the detection target object according to the movement information of the pressure sensor 10 in which the movement mechanism 20 moves along the predetermined movement path and the output of the pressure sensor 10. Here, the tilt information includes information indicating, for example, a tilt angle, horizontality, and whether the detection target object is tilted. According to the present embodiment, for example, an example in which the tilt information detection unit 40 detects a tilt angle of the detection target object will be described.

For example, the tilt information detection unit 40 detects the tilt information of the detection target object according to the movement distance of the pressure sensor 10 and a change in the output value of the pressure sensor 10 with respect to the movement distance. Here, a principle of the tilt angle detection by the tilt information detection unit 40 will be described with reference to FIGS. 2A, 2B, 3A, and 3B.

<Principle of the Tilt Angle Detection>

Figure 2A:
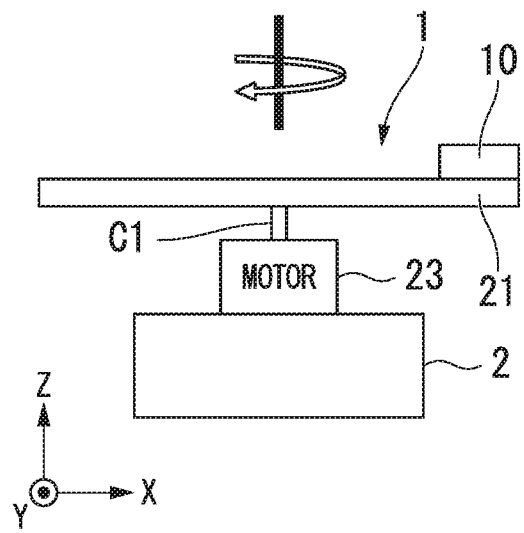
FIG. 2A is a first diagram for describing an example of an output signal in the horizontal state of a pressure sensor according to the first embodiment.
Figure 2B:
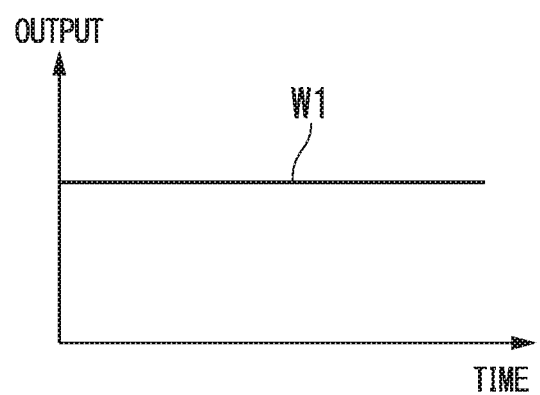
FIG. 2B is a second diagram for describing the example of the output signal in the horizontal state of the pressure sensor according to the first embodiment.

FIGS. 2A and 2B are diagrams for describing an example of an output signal in the horizontal state of the pressure sensor 10 according to the present embodiment.

FIG. 2A shows a state when the tilt sensor 1 is mounted on the detection target object 2 and the detection target object 2 is horizontal (the horizontal state of the detection target object 2). FIG. 2B shows an output signal of the pressure sensor 10 in the horizontal state of the detection target object 2.

In FIG. 2B, the vertical axis of the graph represents a voltage of the output signal of the pressure sensor 10 and the horizontal axis of the graph represents time. A waveform W1 indicates a waveform of the output signal of the pressure sensor 10.

As shown in FIG. 2A, when the detection target object 2 is in the horizontal state, the pressure sensor 10 that is moving in the circular form is moving horizontally along with the rotary plate 21. Accordingly, as indicated by the waveform W1 in FIG. 2B, a constant voltage is output.

Figure 3A:
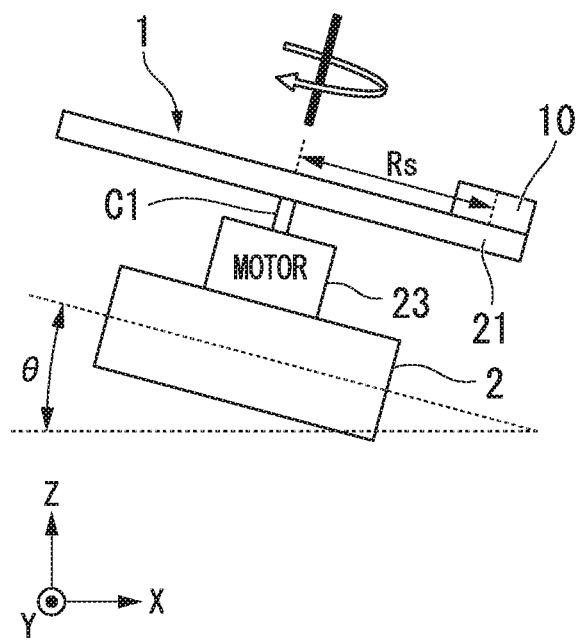
FIG. 3A is a first diagram for describing an example of an output signal in a tilted state of the pressure sensor according to the first embodiment.
Figure 3B:
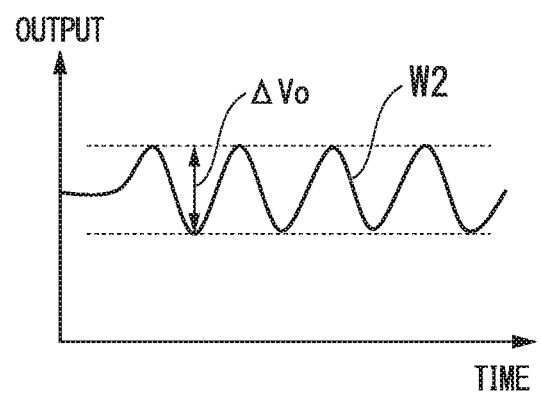
FIG. 3B is a second diagram for describing the example of the output signal in the tilted state of the pressure sensor according to the first embodiment.

FIGS. 3A and 3B are diagrams for describing an example of an output signal in a tilted state of the pressure sensor 10 according to the present embodiment.

FIG. 3A shows a state when the tilt sensor 1 is mounted on the detection target object 2 and the detection target object 2 is tilted at a tilt angle θ in the X axis direction (in a tilted state of the detection target object 2). FIG. 3B shows an output signal of the pressure sensor 10 in the tilted state of the detection target object 2.

In FIG. 3B, the vertical axis represents a voltage of the output signal of the pressure sensor 10 and the horizontal axis represents time. A waveform W2 indicates a waveform of the output signal of the pressure sensor 10.

As shown in FIG. 3A, when the detection target object 2 is tilted at the tilt angle θ in the X axis direction, the pressure sensor 10 that is moving in the circular form is displaced in the Z axis direction along with the rotary plate 21. Accordingly, as indicated by the waveform W2 in FIG. 3B, a periodic output signal is output. In this case, the pressure sensor 10 detects a change of the atmospheric pressure according to the displacement (a change in height) in the Z axis direction and the pressure sensor 10 outputs a sinusoidal output signal as in the waveform W2. When a change amount ΔVo is a change amount between peaks of the output signals (the waveform W2), for example, the change amount ΔVo increases with an increase in the tilt angle θ and the change amount ΔVo decreases with a decrease in the tilt angle θ. The tilt angle θ can be calculated by the following Expression (1).

[Math. 1]

$$\text{TILT ANGLE } \theta = \sin^{-1}\left(\frac{(\text{VARIATION IN ACCORDANCE WITH }\Delta Vo)}{2 \times Rs}\right) \quad (1)$$

Here, as shown in FIG. 3A, the variable Rs indicates a radius of rotation of the pressure sensor 10. The "change in the height corresponding to the change amount ΔVo" is a value obtained by converting the change amount ΔVo of the output signal of the pressure sensor 10 into a height in the Z axis direction. For example, the tilt information detection unit 40 may convert the "change in the height corresponding to the change amount ΔVo" from the change amount ΔVo by calculation or may generate the "change in the height corresponding to the change amount ΔVo" according to a conversion table in which the change amount ΔVo and the change in the height are associated with each other.

The tilt information detection unit 40 generates the tilt angle θ as tilt information using the above-described Expression (1).

Turning back to the description of FIG. 1, the tilt information detection unit 40 performs synchronization detection according to the synchronous clock signal generated by the synchronous clock signal generation unit 33 and the periodic output signal output from the pressure sensor 10, and the tilt information detection unit 40 detects the tilt information in a predetermined direction of the detection target object according to a result of the synchronization detection. The tilt information detection unit 40 includes a synchronization detection unit 41 and a tilt angle generation unit 42.

The synchronization detection unit 41 performs the synchronization detection according to the periodic output signal of the above-described pressure sensor 10 and the synchronous clock signal generated by the synchronous clock signal generation unit 33. For example, the synchronization detection unit 41 includes a lock-in amplifier circuit and a low-pass filter (LPF), and the synchronization detection unit 41 generates a direct-current signal that is proportional to the amplitude of the output signal of the pressure sensor 10. The detailed operation of the synchronization detection unit 41 will be described below with reference to FIGS. 4 and 5.

The tilt angle generation unit 42 generates the tilt angle θ as the tilt information using the above-described Expression (1). For example, the tilt angle generation unit 42 generates a change amount of the height of the pressure sensor 10 according to the direct-current signal proportional to the amplitude of the output signal of the pressure sensor 10 and the tilt angle generation unit 42 generates the tilt angle θ of the detection target object according to the generated change amount in the height and the above-described Expression (1). The tilt angle generation unit 42 outputs information indicating the generated tilt angle θ as the tilt information.

Next, an operation of the tilt sensor 1 according to the present embodiment will be described with reference to the following drawing.

When the tilt sensor 1 mounted on the detection target object detects the tilt information (for example, the tilt angle θ), the motor control unit 22 of the movement mechanism 20 firstly drives the motor 23 so that the motor 23 rotates at a predetermined rotation speed. The motor 23 rotates the rotary plate 21 via the rotational axis C1. When the rotary plate 21 is rotated, the pressure sensor 10 and the magnet 31 disposed on the rotary plate 21 are moved in the circular form at the predetermined rotation speed.

When the magnet 31 disposed on the rotary plate 21 approaches the rotation detection unit 32, the rotation detection unit 32 detects the reference position of the rotary plate 21 and outputs a detection signal. Then, the synchronous clock signal generation unit 33 generates the synchronous clock signal so that, for example, a tilt in the X axis direction is synchronously detected by using the detection signal output from the rotation detection unit 32 as a trigger, and the synchronous clock signal generation unit 33 outputs the generated synchronous clock signal to the tilt information detection unit 40.

When the detection target object is tilted, according to the rotation of the rotary plate 21, the pressure sensor 10 outputs the sinusoidal output signal indicated by the waveform W2 in FIG. 3B to the tilt information detection unit 40 via the slip ring 35.

The synchronization detection unit 41 of the tilt information detection unit 40 synchronously detects the output signal of the pressure sensor 10 in accordance with the synchronous clock signal generated by the synchronous clock signal generation unit 33, and the synchronization detection unit 41 outputs, for example, the direct-current signal proportional to the amplitude of the output signal of the pressure sensor 10 in accordance with the tilt in the X axis direction.

Figure 4:
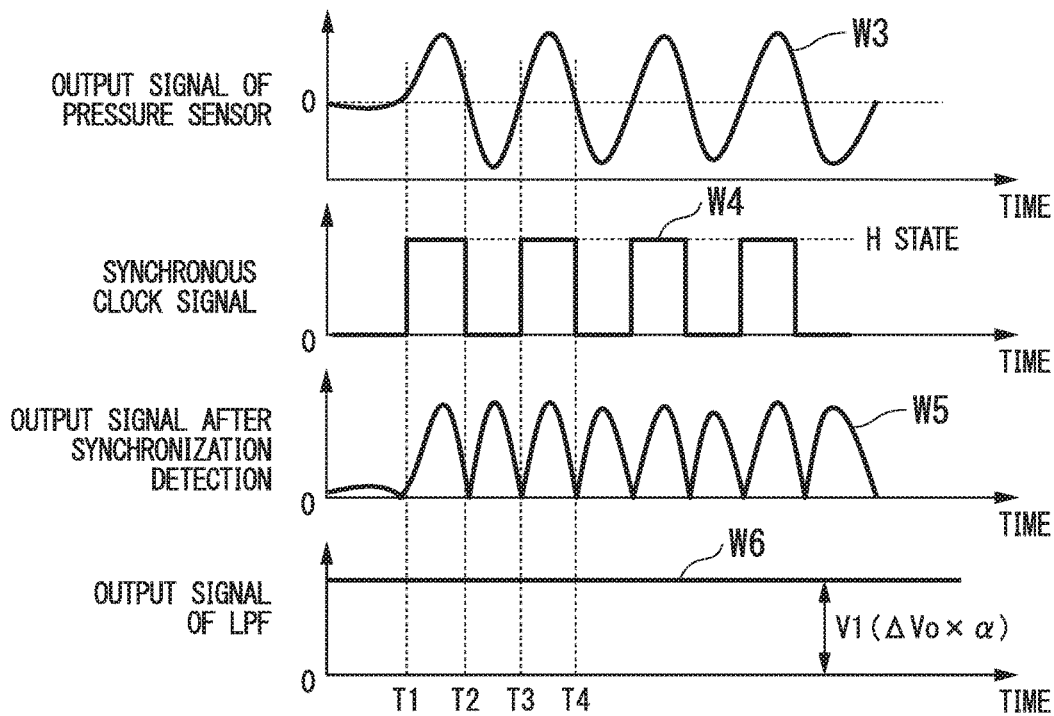
FIG. 4 is a first diagram showing an example of an operation of a synchronization detection unit according to the first embodiment.

FIG. 4 is a first diagram showing an example of an operation of the synchronization detection unit 41 according to the present embodiment.

The example shown in FIG. 4 is an example in which the detection target object is tilted in the X axis direction. In this drawing, the vertical axis of each graph represents a voltage of each output signal and the horizontal axis of each graph represents time. Waveforms W3 to W6 indicate waveforms of the output signal of the pressure sensor 10, the synchronous clock signal, the output signal subjected to the synchronization detection, and an output signal of the LPF in sequence.

Since the example shown in FIG. 4 is an example of the case when the detection target object is tilted in the X axis direction, phases of the waveform W3 of the output signal and the waveform W4 of the synchronous clock signal of the pressure sensor 10 are matched with each other. Accordingly, the synchronization detection unit 41 generates an output signal indicated by the waveform W5 as a result obtained by performing the synchronization detection. As the synchronization detection, the synchronization detection unit 41 multiplies the output signal of the pressure sensor 10 by "+1" to generate a result obtained by performing the synchronization detection since the synchronous clock signal is in an H state (high state) during, for example, a period from time T1 to time T2 and a period from time T3 to time T4. The synchronization detection unit 41 multiplies the output signal of the pressure sensor 10 by "−1" to generate a result obtained by the synchronization detection since the synchronous clock signal is 0 V (in a low state) during, for example, a period from time T2 to time T3. Thus, the synchronization detection unit 41 generates an output signal subjected to the synchronization detection and indicated by the waveform W5 as the result obtained by performing the synchronization detection.

The synchronization detection unit 41 generates a signal with a direct-current voltage proportional to the amplitude of the output signal of the pressure sensor 10 and indicated by a waveform W6, by causing the low-pass filter (LPF) to remove a component equal to or greater than a predetermined frequency from the output signal subjected to the synchronization detection and indicated by the waveform W5. Here, a voltage V1 of the direct-current signal indicated by the waveform W6 is a value which is a predetermined coefficient α times the variation amount ΔVo shown in FIG. 3B, as described above.

Figure 5:
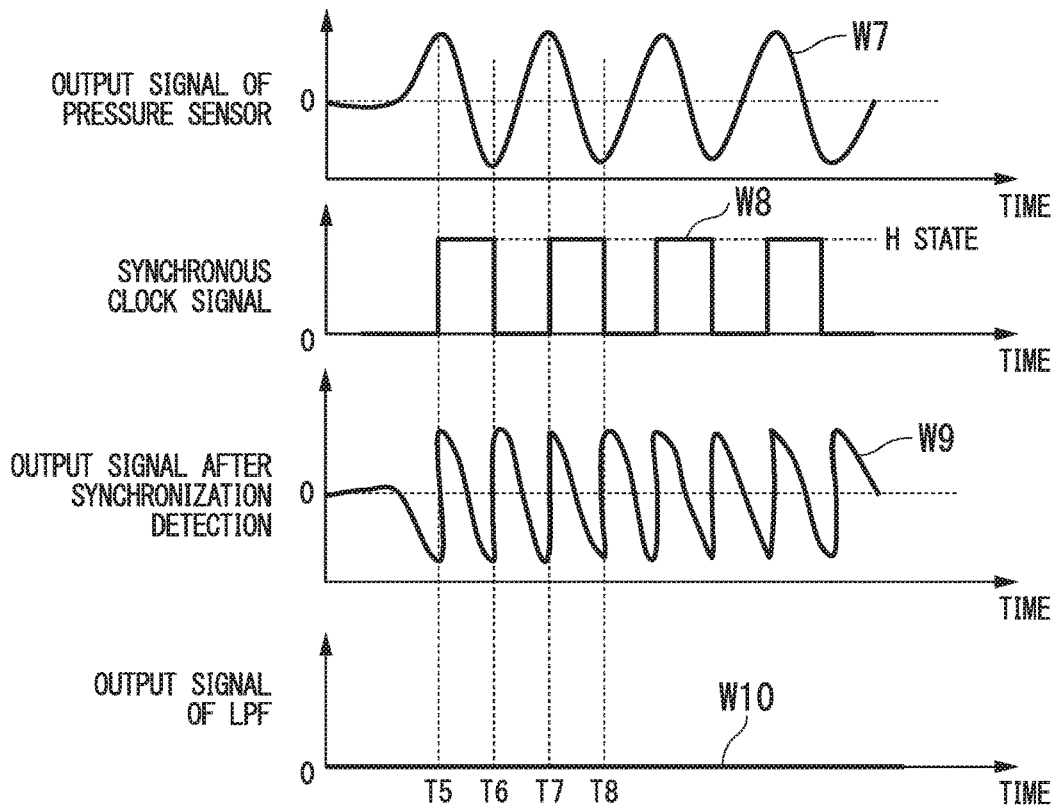
FIG. 5 is a second diagram showing an example of an operation of the synchronization detection unit according to the first embodiment.

FIG. 5 is a second diagram showing an example of an operation of the synchronization detection unit 41 according to the present embodiment.

The example shown in FIG. 5 is an example of a case when the detection target object is tilted in the Y axis direction (a case when the detection target object is not tilted in the X axis direction). In the drawing, the vertical axis of each graph represents a voltage of each output signal and the horizontal axis of each graph represents time. Waveforms W7 to W10 indicate waveforms of the output signal of the pressure sensor 10, the synchronous clock signal, the output signal subjected to the synchronization detection, and an output signal of the LPF in sequence.

Since the example shown in FIG. 5 is an example of the case when the detection target object is tilted in the Y axis direction (the case when the detection target object is not tilted in the X axis direction), phases of the waveform W7 of the output signal and the waveform W8 of the synchronous clock signal of the pressure sensor 10 are deviated by 90 degrees (¼ period). Accordingly, the synchronization detection unit 41 generates an output signal indicated by the waveform W9 as a result obtained by performing the synchronization detection. As the synchronization detection, the synchronization detection unit 41 multiplies the output signal of the pressure sensor 10 by "+1" to generate a result obtained by the synchronization detection since the synchronous clock signal is in an H state (high state) during, for example, a period from time T5 to time T6 and a period from time T7 to time T8. The synchronization detection unit 41 multiplies the output signal of the pressure sensor 10 by "−1" to generate a result obtained by the synchronization detection since the synchronous clock signal is 0 V (in a low state) during, for example, a period from time T6 to time T7. Thus, the synchronization detection unit 41 generates an output signal subjected to the synchronization detection and indicated by the waveform W9 as the result obtained by performing the synchronization detection.

The synchronization detection unit 41 generates a signal with a direct-current voltage indicated by a waveform W10 by causing the low-pass filter (LPF) to remove a component equal to or greater than a predetermined frequency from the output signal subjected to the synchronization detection and indicated by the waveform W9. Here, since the detection target object is tilted in the Y axis direction, the voltage of the direct-current signal with the waveform W10 is 0V.

Subsequently, the tilt angle generation unit 42 generates a tilt angle θ as tilt information using the above-described Expression (1) according to the direct-current signal generated by the synchronization detection unit 41. For example, the tilt angle generation unit 42 generates a change amount of the height of the pressure sensor 10 according to the voltage value of the direct-current signal, and the tilt angle generation unit 42 generates the tilt angle θ of the detection target object according to the generated change amount of the height and the above-described Expression (1).

In the example shown in FIG. 4 described above, for example, the tilt angle generation unit 42 generates the tilt angle θ in the X axis direction according to the voltage V1 of the waveform W6. In the example shown in FIG. 5 described above, the tilt angle generation unit 42 generates the tilt angle θ in the X axis direction as 0 degrees since the detection target object is not tilted in the X axis direction and the voltage of the waveform W10 is 0V.

In this way, the tilt information detection unit 40 according to the present embodiment can appropriately detect the tilt angle θ in a predetermined direction (here, the X axis direction) by using the synchronization detection.

As described above, the tilt sensor 1 according to the present embodiment includes the pressure sensor 10 and the tilt information detection unit 40. The pressure sensor 10 is disposed to be able to move relative to a detection target object and detects pressure of a fluid (for example, a gas or a liquid). The tilt information detection unit 40 detects the tilt information (for example, information indicating the tilt angle θ) of the detection target object according to the output of the pressure sensor 10 and the movement information (for example, rotational position information) of the pressure sensor 10.

Since the tilt sensor 1 according to the present embodiment detects the tilt information using the pressure sensor 10, there is no influence of acceleration. For example, there is no influence of the acceleration in the horizontal direction on the tilt sensor 1 according to the present embodiment. Since the tilt sensor 1 according to the present embodiment can move the pressure sensor 10 to detect the tilt information and at least one pressure sensor 10 can detect the tilt information, detection precision does not deteriorate due to, for example, variation between the plurality of pressure sensors 10. Accordingly, the tilt sensor 1 according to the present embodiment can improve the detection precision of the tilt information.

When the acceleration sensor is used in the detection of the tilt information, it is necessary to perform integration twice for converting a change in acceleration into a change in a distance. When acceleration is detected from a centrifugal force according to an output of an acceleration sensor or an angular velocity is detected by a gyro sensor (an angular velocity sensor), it is necessary to perform integration once in order to calculate an angle from the angular velocity. In this way, when an acceleration sensor or a gyro sensor is used, integration is necessary and errors due to the integration are accumulated, and thus the detection precision of the tilt information tends to deteriorate.

However, in the tilt sensor 1 according to the present embodiment, the pressure sensor 10 is used. Accordingly, the above-described errors in the integration are not accumulated and it is possible to improve the detection precision of the tilt information. The tilt sensor 1 according to the present embodiment can detect the tilt angle θ through a simple calculation process using the above-described Expression (1).

Since there is no influence of acceleration on the tilt sensor 1 according to the present embodiment, it is possible to obtain the tilt information with higher reliability than when an acceleration sensor is used.

According to the present embodiment, the tilt information detection unit 40 detects the tilt information of the detection target object according to the movement distance of the pressure sensor 10 and the change in the output value of the pressure sensor 10 to the movement distance.

The tilt sensor 1 according to the present embodiment can detect the tilt information of the detection target object, for example, in accordance with the simple method using the above-described Expression (1).

The tilt sensor 1 according to the present embodiment includes the movement mechanism 20 that moves the pressure sensor 10 to a detection target object along the predetermined movement path. The tilt information detection unit 40 detects the tilt information of the detection target object according to the movement information of the pressure sensor 10 moved along the predetermined movement path (for example, the movement path in a circular form) by the movement mechanism 20 and the output of the pressure sensor 10.

Since the pressure sensor 10 is moved along the predetermined movement path, the tilt sensor 1 according to the present embodiment can easily calculate the movement distance of the pressure sensor 10 by detecting the position information (for example, rotational position information). Accordingly, the tilt sensor 1 according to the present embodiment can simplify the calculation of the movement information.

According to the present embodiment, the movement mechanism 20 includes the rotary plate 21 (rotator) on which the pressure sensor 10 is disposed and moves the pressure sensor 10 in the circular form by rotating the rotary plate 21.

Since the tilt sensor 1 according to the present embodiment can easily obtain the sinusoidal periodic output signal from the pressure sensor 10, for example, the simple detection method such as synchronization detection can be used. The tilt sensor 1 according to the present embodiment can easily calculate the movement distance of the pressure sensor 10 from the radius Rs of rotation of the pressure sensor 10. Accordingly, the tilt sensor 1 according to the present embodiment can simplify the process of detecting the tilt information of the detection target object.

According to the present embodiment, the tilt information detection unit 40 performs the synchronization detection according to the periodic output signal (the sinusoidal output signal) output from the pressure sensor 10 moved along the predetermined movement path and the synchronous clock signal (the reference signal) which is according to the movement information, and the tilt information detection unit 40 detects the tilt information of the detection target object according to the result of the synchronization detection.

Since the tilt sensor 1 according to the present embodiment uses the synchronization detection, the process of detecting the tilt information of the detection target object can be simplified.

The tilt sensor 1 according to the present embodiment includes the synchronous clock signal generation unit 33 (the reference signal generation unit) that generates the synchronous clock signal (the reference signal) corresponding to the tilt in the predetermined direction according to the movement information. Then, the tilt information detection unit 40 performs the synchronization detection according to the synchronous clock signal generated by the synchronous clock signal generation unit 33 and the periodic output signal output from the pressure sensor 10, and the tilt information detection unit 40 detects the tilt information of the detection target object in the predetermined direction according to the result of the synchronization detection.

Thus, the tilt sensor 1 according to the present embodiment can detect the tilt information of the detection target object in the predetermined direction.

The tilt sensor 1 according to the present embodiment includes the rotation detection unit 32 (the movement information detection unit) that detects the movement information of the pressure sensor 10. For example, the rotation detection unit 32 is a Hall element that detects the position of the magnet 31 on the rotary plate 21.

Thus, the tilt sensor 1 according to the present embodiment can accurately detect the movement information (for example, the rotational position information).

According to the present embodiment, the pressure sensor 10 is a difference pressure sensor. The difference pressure sensor can detect a more minute change in the atmospheric pressure than an absolute pressure sensor. Accordingly, the tilt sensor 1 according to the present embodiment can detect a change in the atmospheric pressure at a short movement distance compared to a case when an absolute pressure sensor is used. Accordingly, since a movement distance of the pressure sensor 10 can be shortened, the tilt sensor 1 according to the present embodiment can be miniaturized compared to when the absolute pressure sensor is used.

Second Embodiment

Next, a tilt sensor 1a according to a second embodiment will be described with reference to the drawings.

Figure 6:
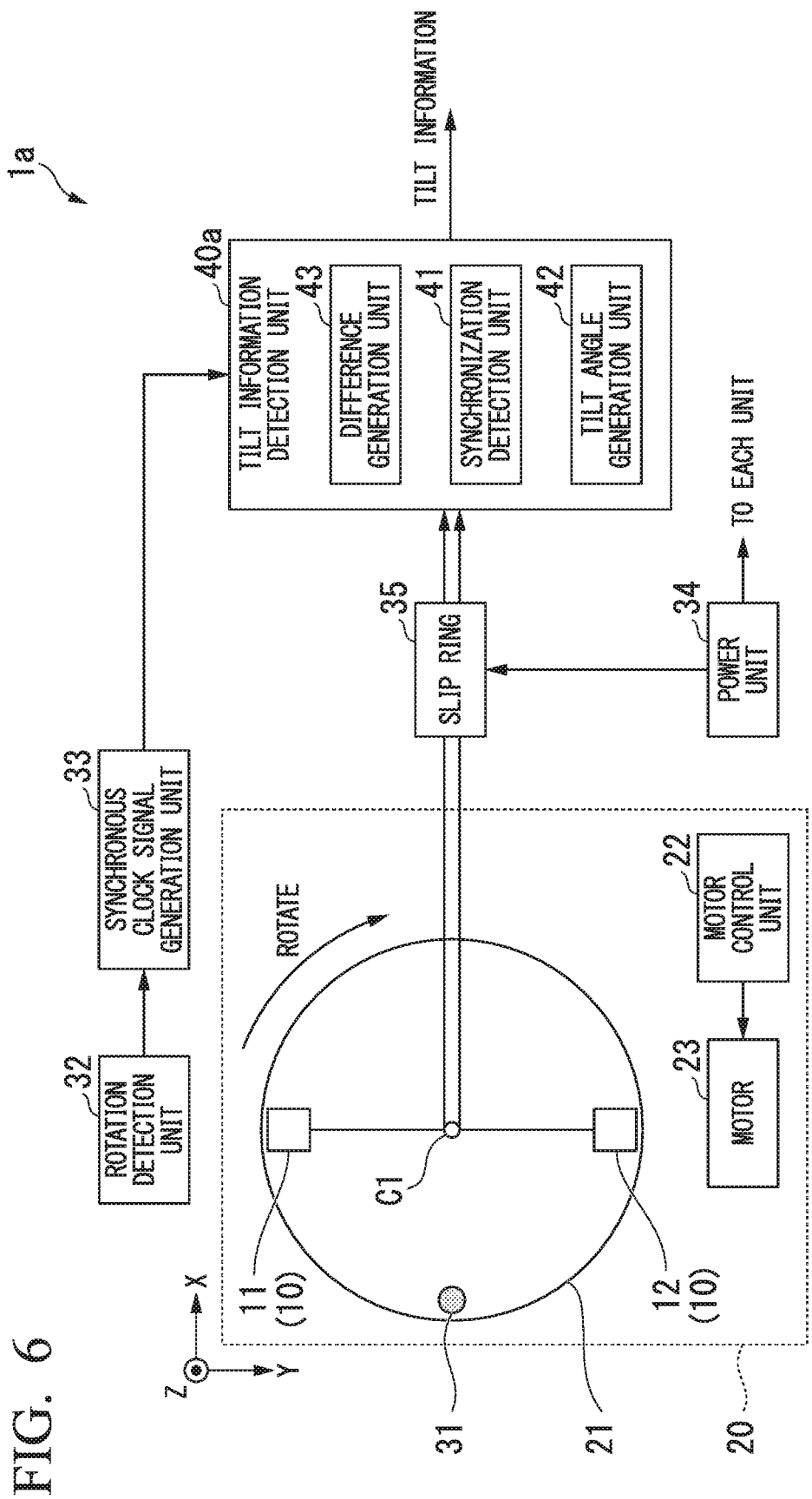
FIG. 6 is a block diagram showing an example of a tilt sensor according to a second embodiment.

FIG. 6 is a block diagram showing an example of the tilt sensor 1a according to the second embodiment.

As shown in FIG. 6, the tilt sensor 1a includes pressure sensors (11 and 12), a movement mechanism 20, a magnet 31, a rotation detection unit 32, asynchronous clock signal generation unit 33, a power unit 34, a slip ring 35, and a tilt information detection unit 40a.

In FIG. 6, the same reference numerals are given to the same configuration as the configuration shown in FIG. 1, and the description thereof will be omitted.

The present embodiment is different from the first embodiment in that the tilt sensor 1a includes the plurality of (for example, two) pressure sensors (11 and 12), and the tilt information detection unit 40a detects tilt information of a detection target object according to output signals of the two pressure sensors (11 and 12). The differences will be described below.

The pressure sensors (11 and 12) have the same configuration as the above-described pressure sensor 10. According to the present embodiment, the pressure sensors will be described as the pressure sensor 10 when the pressure sensors are any pressure sensor included in the tilt sensor 1a or the pressure sensors are not particularly distinguished from each other.

The pressure sensors 11 and 12 are disposed on the rotary plate 21 to be able to move in a circular form through a rotational movement of the rotary plate 21. The pressure sensor 11 and the pressure sensor 12 are disposed to output output signals with mutually reversed phases due to the movement in the circular form. For example, the pressure sensor 11 and the pressure sensor 12 are disposed at concentric circle of the rotary plate 21 and at positions at which a central angle of the rotary plate 21 deviates mutually at 180 degrees.

The tilt information detection unit 40a detects tilt information of a detection target object according to the outputs of the plurality of (for example, two) pressure sensors 10 and the movement information of the pressure sensors 10. That is, the tilt information detection unit 40a detects the tilt information of the detection target object according to the two output signals with the mutually reversed phases and the movement information of the pressure sensors 10. The tilt information detection unit 40a includes a synchronization detection unit 41, a tilt angle generation unit 42, and a difference generation unit 43.

The difference generation unit 43 generates an output signal which is a difference between the output signal of the pressure sensor 11 and the output signal of the pressure sensor 12 (hereinafter referred to as a difference output signal). The detailed operation of the difference generation unit 43 will be described below with reference to FIG. 7.

According to the present embodiment, the synchronization detection unit 41 is the same as that of the first embodiment except that the difference output signal generated by the difference generation unit 43 is used. The tilt angle generation unit 42 is the same as that of the first embodiment except that the amplitude of the difference output signal is a double of the amplitude of the pressure sensor 10.

Next, an operation of the difference generation unit 43 will be described with reference to FIG. 7.

Figure 7:
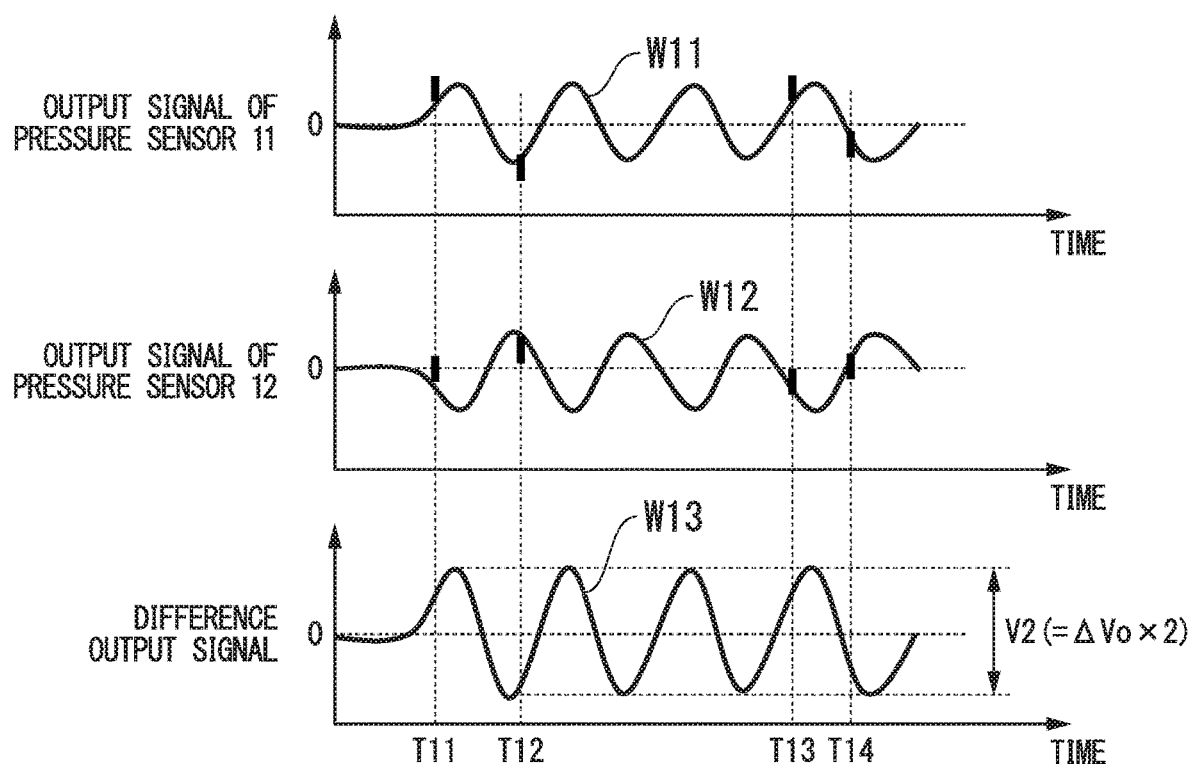
FIG. 7 is a diagram showing an example of an operation of a difference generation unit according to the second embodiment.

FIG. 7 is a diagram showing an example of the operation of the difference generation unit 43 according to the present embodiment.

In FIG. 7, the vertical axis of each graph represents a voltage of each output signal and the horizontal axis of each graph represents a time. Waveforms W11 and W12 indicate waveforms of the output signal of the pressure sensor 11, the output signal of the pressure sensor 12, and the difference output signal in sequence.

The difference generation unit 43 generates a difference output signal indicated by a waveform W13 by calculating a difference between the output signal (the waveform W11) of the pressure sensor 11 and the output signal (the waveform W12) of the pressure sensor 12 which are the output signals with the mutually reversed phases.

In the example shown in FIG. 7, noise occurs at time T11, time T12, time T13, and time T14, and the noise is superimposed on the output signal of the pressure sensor 11 and the output signal of the pressure sensor 12. Even in this case, the noise is cancelled by calculating the difference between the output signal (the waveform W11) of the pressure sensor 11 and the output signal (the waveform W12) of the pressure sensor 12. Accordingly, as indicated by the waveform W13, the difference generation unit 43 outputs the difference output signal from which the noise is removed.

A voltage difference V2 between peaks of the difference output signal is a double of the voltage difference (the above-described variation amount ΔVo) between the peaks of the output signal of the pressure sensor 10. Accordingly, the tilt sensor 1*a* according to the present embodiment can improve a signal-noise ratio (S/N ratio).

Operations of the synchronization detection unit 41 and the tilt angle generation unit 42 according to the present embodiment are the same as those of the first embodiment. As described above, however, since the amplitude of the difference output signal is the double, a value of the predetermined coefficient α times is doubled in the result obtained by performing the synchronization detection.

As described above, the tilt sensor 1*a* according to the present embodiment includes the plurality of pressure sensors 10. The tilt information detection unit 40*a* detects the tilt information of the detection target object according to the outputs of the plurality of pressure sensors 10 and the movement information of the pressure sensors 10. Further, the two pressure sensors 10 are disposed to output the output signals with the mutually reversed phases through the movement and the tilt information detection unit 40*a* detects the tilt information of the detection target object according to the two output signals with the mutually reversed phases and the movement information of the pressure sensors 10.

Thus, the tilt sensor 1*a* according to the present embodiment can reduce the noise component contained in the output signals of the pressure sensors 10, for example, by taking the difference between the two output signals with the mutually reversed phases.

The tilt sensor 1*a* according to the present embodiment can improve the S/N ratio, as described above, by taking the difference between the two output signals with the mutually reversed phases. The tilt sensor 1*a* according to the present embodiment can improve detection sensitivity of the tilt information by taking the difference between the two output signals with the mutually reversed phases.

Third Embodiment

Next, a tilt sensor 1*b* according to a third embodiment will be described with reference to the drawings.

Figure 8:
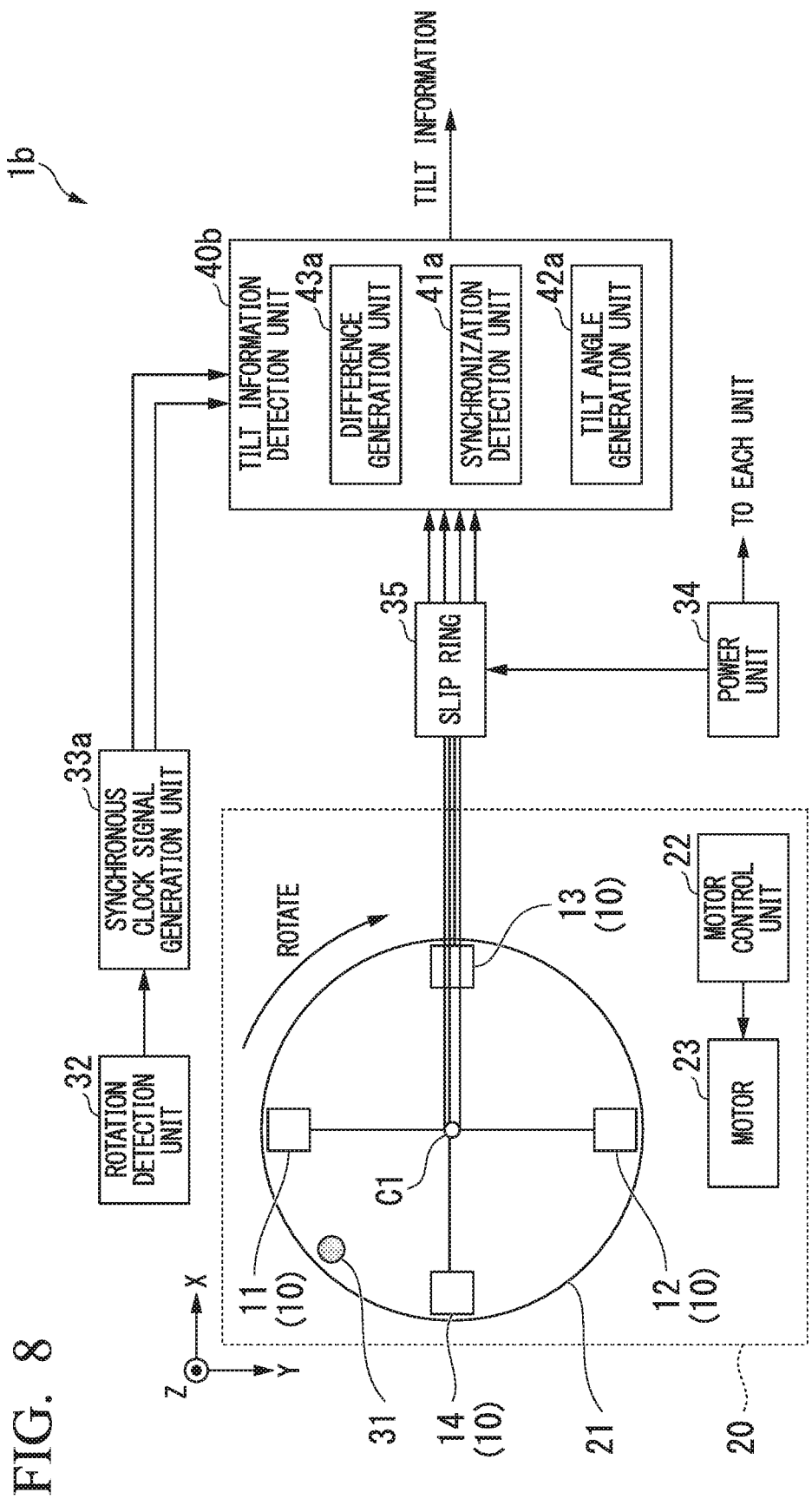
FIG. 8 is a block diagram showing an example of a tilt sensor according to a third embodiment.

FIG. 8 is a block diagram showing an example of the tilt sensor 1*b* according to the third embodiment.

As shown in FIG. 8, the tilt sensor 1*b* includes pressure sensors (11, 12, 13, and 14), a movement mechanism 20, a magnet 31, a rotation detection unit 32, a synchronous clock signal generation unit 33*a*, a power unit 34, a slip ring 35, and a tilt information detection unit 40*b*.

In FIG. 8, the same reference numerals are given to the same configuration as the configuration shown in FIGS. 1 and 6, and the description thereof will be omitted.

The present embodiment is different from the second embodiment in that the tilt sensor 1*b* includes four pressure sensors (11, 12, 13, and 14) and the tilt information detection unit 40*b* detects tilt information of a detection target object according to two-system difference output signals. The differences will be described below.

The pressure sensors (11, 12, 13, and 14) have the same configuration as the above-described pressure sensor 10. According to the present embodiment, the pressure sensors will be described as the pressure sensor 10 when the pressure sensors are any pressure sensor included in the tilt sensor 1*b* or the pressure sensors are not particularly distinguished from each other.

The pressure sensors 11, 12, 13, and 14 are disposed on the rotary plate 21 to be able to move in a circular form through a rotational movement of the rotary plate 21. The pressure sensors 11 and 12 are disposed to output output signals with mutually reversed phases through movement in the circular form. The pressure sensors 13 and 14 are disposed to output output signals with mutually reversed phases through movement in the circular form. For example, the pressure sensors 11 and 12 are set as a first pair of pressure sensors and the pressure sensors 13 and 14 are set as a second pair of pressure sensors.

The first pair of pressure sensors 10 and the second pair of pressure sensors 10 are disposed to output the output signals with phases mutually deviated by 90 degrees. That is, the first pair of pressure sensors 10 and the second pair of pressure sensors 10 are disposed at positions at which a central angle of the rotary plate 21 deviates mutually at 90 degrees. For example, two pressure sensors 10, the pressure sensors 11 and 13, are disposed to output the periodic output signals with the phases mutually deviated by 90 degrees through movement. Two pressure sensor 10, the pressure sensors 12 and 14, are disposed to output the periodic output signals with the phases mutually deviated by 90 degrees through movement.

In order to correspond to the two-system difference output signals of the above-described first and second pairs, the synchronous clock signal generation unit 33*a* generates two kinds of synchronous clock signals with the phases mutually deviated by 90 degrees to correspond to a tilt in a predetermined direction (for example, the X axis direction).

The tilt information detection unit 40*b* detects the tilt information of the detection target object according to the above-described two (two-system) output signals with the phases mutually deviated by 90 degrees and the movement information of the pressure sensors 10. The tilt information detection unit 40*b* includes a synchronization detection unit 41*a*, a tilt angle generation unit 42*a*, and a difference generation unit 43*a*.

The difference generation unit 43*a* generates the two-system difference output signals with the phases deviated by 90 degrees by calculating a difference between the first pair of output signals and the second pair of output signals described above.

The synchronization detection unit 41*a* performs the synchronization detection on each of the two-system difference output signals in accordance with the corresponding synchronous clock signal.

The tilt angle generation unit 42*a* generates a tilt angle θ of the detection target object according to a result of the above-described two-system synchronization detection.

As described above, according to the present embodiment, two pressure sensors 10 are disposed to output the periodic output signals with the phases mutually deviated by 90 degrees due to the movement. The tilt information detection unit 40b detects the tilt information of the detection target object according to the two (two-system) output signals with the phases mutually deviated by 90 degrees and the movement information of the pressure sensors 10.

Thus, since the tilt sensor 1b according to the present embodiment detects the tilt information of the detection target object according to the two-system output signals with the phases mutually deviated by 90 degrees, the amount of information (the number of samples) for the detection is doubled. Accordingly, the tilt sensor 1b according to the present embodiment can further improve the detection precision when the number of rotations of the rotary plate 21 is the same as that of the first and second embodiments. The tilt sensor 1b according to the present embodiment can reduce the number of rotations of the rotary plate 21 when the detection precision is set to be the same as that of the first and second embodiments. In this case, the tilt sensor 1b according to the present embodiment can reduce power consumption for the detection while ensuring the detection precision. The tilt sensor 1b according to the present embodiment can reduce noise occurring due to an operation of the movement mechanism 20 such as the motor 23 by reducing the number of rotations of the rotary plate 21.

According to the present embodiment, as the same with the second embodiment, two pressure sensors 10 are disposed to output the output signals with the mutually reversed phases due to the movement, and the tilt information detection unit 40b detects the tilt information of the detection target object according to the two output signals with the mutually reversed phases and the movement information of the pressure sensors 10. Accordingly, as the same with the second embodiment, the tilt sensor 1b according to the present embodiment can reduce the noise component contained in the output signals of the pressure sensors 10 and can improve the S/N ratio.

The tilt sensor 1b according to the above-described embodiment may perform the synchronization detection on the two-system output signals with the phases mutually deviated by 90 degrees using one synchronous clock signal. In this case, the tilt sensor 1b according to the present embodiment can detect tilt angles in two directions (for example, two directions of the X and Y axis directions) of the rectangular coordinate system. For example, the tilt sensor 1b can detect the tilt angle in the X axis direction according to the output signal of the pressure sensor 11 and can detect the tilt angle in the Y axis direction according to the output signal of the pressure sensor 13. That is, in this case, the tilt sensor 1b according to the present embodiment can detect the tilt information in any direction on a 2-dimensional plane.

Fourth Embodiment

Next, a tilt sensor 1c according to a fourth embodiment will be described with reference to the drawings.

Figure 9:
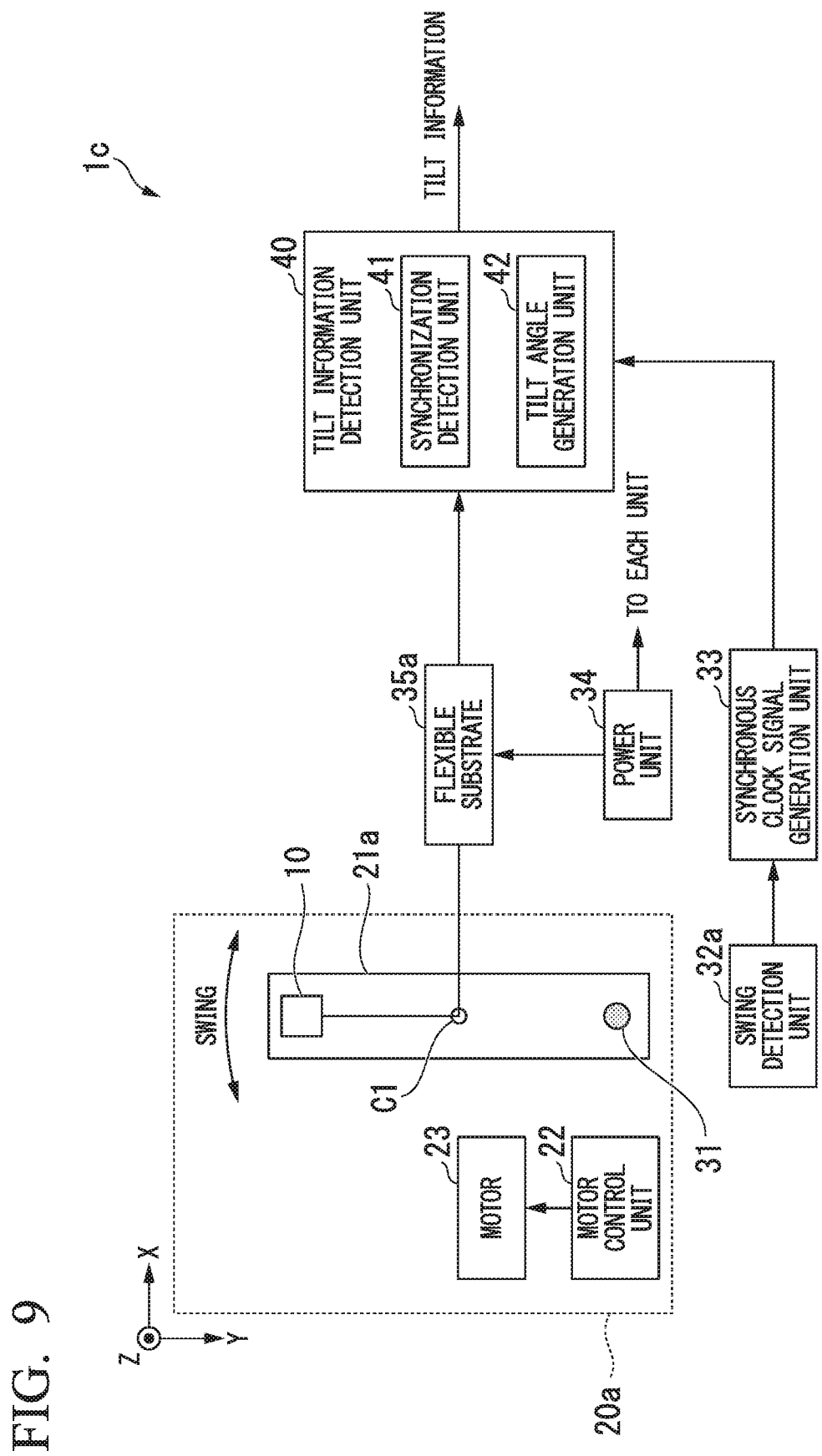
FIG. 9 is a block diagram showing an example of a tilt sensor according to a fourth embodiment.

FIG. 9 is a block diagram showing an example of the tilt sensor 1c according to the fourth embodiment.

As shown in FIG. 9, the tilt sensor 1c includes a pressure sensor 10, a movement mechanism 20a, a magnet 31, a swing detection unit 32a, a synchronous clock signal generation unit 33, a power unit 34, a flexible substrate 35a, and a tilt information detection unit 40.

In FIG. 9, the same reference numerals are given to the same configuration as the configuration shown in FIG. 1, and the description thereof will be omitted.

According to the present embodiment, an example of a case when the movement of the pressure sensor 10 is set as a swing movement in which the pressure sensor 10 reciprocates in an arc form instead of the movement in the circular form will be described.

The movement mechanism 20a includes a swing plate 21a (rotator) on which the pressure sensor 10 is disposed and the movement mechanism 20a moves the pressure sensor 10 in the arc form by rotating the swing plate 21a. That is, the movement mechanism 20a enables the swing movement in which the pressure sensor 10 reciprocates in the arc form. The movement mechanism 20a includes, for example, the swing plate 21a, the motor control unit 22, and the motor 23.

The pressure sensor 10 and the magnet 31 are disposed on the swing plate 21a (an example of a rotator) and the swing plate 21a is rotated about a rotation axis C1 (central axis) in the Z axis direction alternately in different directions by the motor 23. The pressure sensor 10 and the magnet 31 are swung by rotating the swing plate 21a alternately in the different directions.

The motor control unit 22 performs control such that the pressure sensor 10 is swung by alternately rotating the swing plate 21a alternately in the different directions, as described above.

The swing detection unit 32a (an example of a movement information detection unit) detects movement information of the pressure sensor 10. The swing detection unit 32a is, for example, a magnetic detection element such as a Hall element, and the swing detection unit 32a detects a reference position of the swing plate 21a when the magnet 31 disposed on the swing plate 21a approaches and outputs a detection signal to the synchronous clock signal generation unit 33.

The flexible substrate 35a is signal transmission means configured to supply a power voltage (supply power) generated by the power unit 34 to the pressure sensor 10 disposed on the swing plate 21a while transferring an output signal output from the pressure sensor 10 to the tilt information detection unit 40.

Next, an operation of the tilt sensor 1c according to the present embodiment will be described.

In the tilt sensor 1c according to the present embodiment, when the pressure sensor 10 is swung by the movement mechanism 20a, the pressure sensor 10 outputs a periodic output signal according to a tilt of the detection target object. The synchronous clock signal generation unit 33 generates a synchronous clock signal to detect a tilt in a predetermined direction (for example, the X axis direction) according to information indicating a swing position detected by the swing detection unit 32a. The tilt information detection unit 40 performs synchronous detection according to the periodic output signal output via the flexible substrate 35a by the pressure sensor 10 and the synchronous clock signal and detects the tilt information (for example, the tilt angle θ) according to a result of the synchronous detection.

The detailed operation of the tilt information detection unit 40 is the same as that of the above-described first embodiment, and thus the description thereof will be omitted here.

As described above. According to the present embodiment, the movement mechanism 20a includes the swing plate 21a (the rotator) on which the pressure sensor 10 is disposed and moves the pressure sensor 10 in the arc form by rotating the swing plate 21a. For example, the movement mechanism 20a swings the pressure sensor 10 by reciprocating the pressure sensor 10 in the arc form.

Thus, the tilt sensor 1c according to the present embodiment can improve the detection precision of the tilt information as in the first embodiment. Since the pressure sensor 10 outputs the periodic output signal due to the swing movement in which the pressure sensor 10 reciprocates in the arc form, the tilt sensor 1c according to the present embodiment can simplify the process of detecting the tilt information of the detection target object using the synchronous detection.

According to the present embodiment, the power voltage (supply power) is supplied to the pressure sensor 10 and the output signal of the pressure sensor 10 is transferred to the tilt information detection unit 40 via the flexible substrate 35a, instead of the slip ring 35. Accordingly, the tilt sensor 1c according to the present embodiment can further reduce the influence of the noise than when the slip ring 35 is used. Since the flexible substrate 35a is less likely to cause a contact failure than the slip ring 35, the tilt sensor 1c according to the present embodiment can improve reliability in the detection of the tilt information.

Fifth Embodiment

Next, a tilt sensor 1d according to a fifth embodiment will be described with reference to the drawings.

According to the present embodiment, an example of combining the second embodiment with the above-described fourth embodiment will be described.

Figure 10:
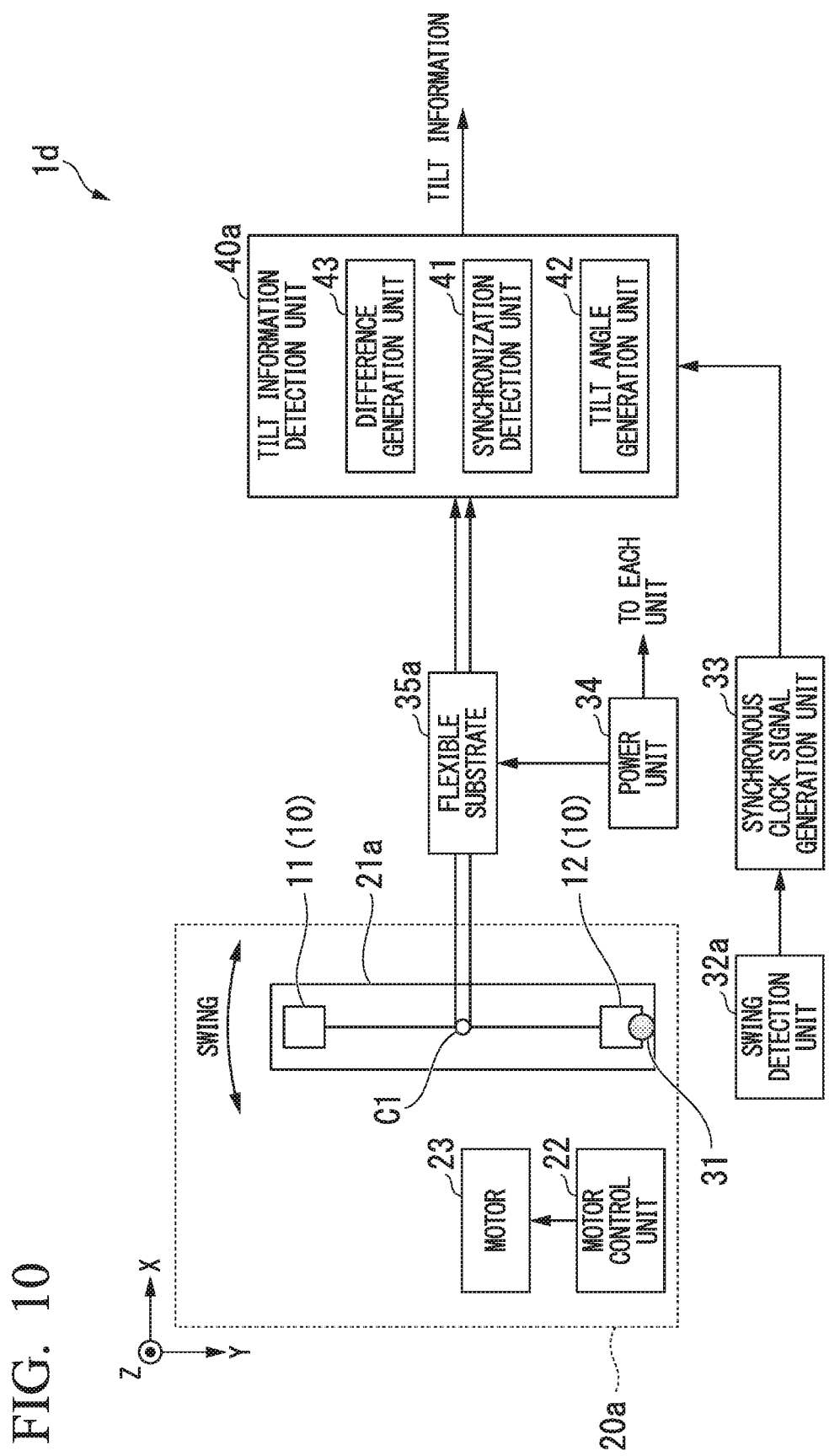
FIG. 10 is a block diagram showing an example of a tilt sensor according to a fifth embodiment.

FIG. 10 is a block diagram showing an example of the tilt sensor 1d according to the fifth embodiment.

As shown in FIG. 10, the tilt sensor 1d includes pressure sensors 10, a movement mechanism 20a, a magnet 31, a swing detection unit 32a, a synchronous clock signal generation unit 33, a power unit 34, a flexible substrate 35a, and a tilt information detection unit 40a.

In FIG. 10, the same reference numerals are given to the same configuration as the configurations shown in FIGS. 9 and 6, and the description thereof will be omitted.

According to the present embodiment, the pressure sensors 11 and 12 are disposed on the swing plate 21a to be movable in an arc form through rotation of the swing plate 21a. The pressure sensors 11 and 12 are disposed to output output signals with mutually reversed phases through the movement in the arc form.

An operation of the tilt sensor 1d according to the present embodiment is basically the same with that of the second embodiment except that the pressure sensors 11 and 12 are swung, and thus the description thereof will be omitted here.

According to the present embodiment, as described above, as the same with the second embodiment, two pressure sensors 10 are disposed to output the output signals with the mutually reversed phases due to the swing movement, and the tilt information detection unit 40a detects tilt information of the detection target object according to the two output signals with the mutually reversed phases and the movement information of the pressure sensors 10.

Thus, the tilt sensor 1d according to the present embodiment obtain the same advantageous effects as those of the fourth embodiment, can reduce the noise component contained in the output signals of the pressure sensors 10, and thus can improve the S/N ratio as the same with the second embodiment.

Sixth Embodiment

Next, a tilt sensor 1e according to a sixth embodiment will be described with reference to the drawings.

Figure 11:
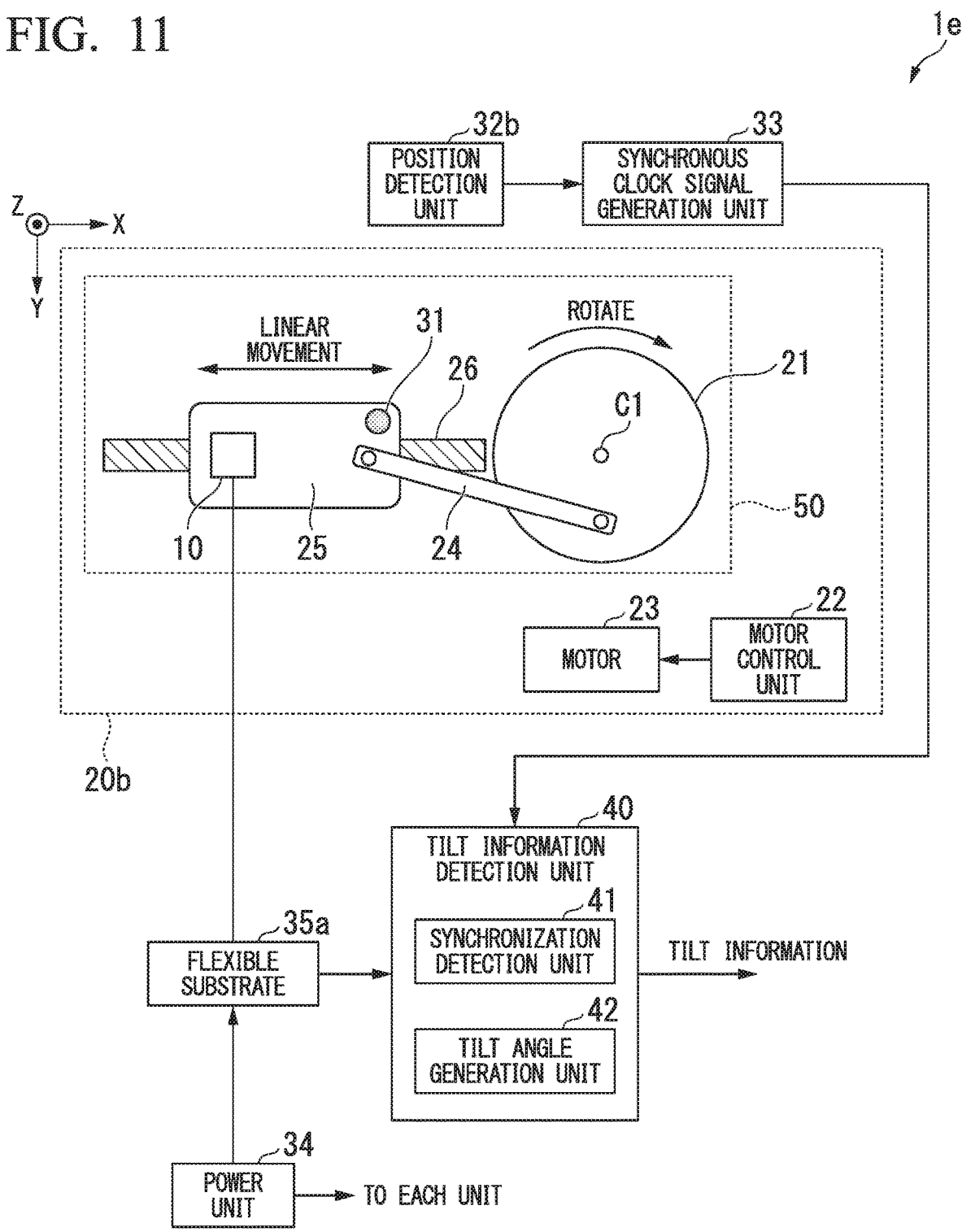
FIG. 11 is a block diagram showing an example of a tilt sensor according to a sixth embodiment.

FIG. 11 is a block diagram showing an example of the tilt sensor 1e according to the sixth embodiment.

As shown in FIG. 11, the tilt sensor 1e includes a pressure sensor 10, a movement mechanism 20b, a magnet 31, a position detection unit 32b, a synchronous clock signal generation unit 33, a power unit 34, a flexible substrate 35a, and a tilt information detection unit 40.

In FIG. 11, the same reference numerals are given to the same configuration as the configuration shown in FIGS. 1 and 9, and the description thereof will be omitted.

According to the present embodiment, an example of a case when the movement of the pressure sensor 10 is set as linear movement in which the pressure sensor 10 reciprocates in a linear form instead of the movement in the circular form will be described.

The movement mechanism 20b includes a movement plate 25 (linear mover) on which the pressure sensor 10 is disposed and can move in the linear form, and the movement mechanism 20b linearly moves the pressure sensor 10 by moving the movement plate 25 in the linear form. That is, the movement mechanism 20b enables linear movement in which the pressure sensor 10 reciprocates in the linear form. The movement mechanism 20b includes, for example, a linear tracking mechanism. 50, the motor control unit 22, and the motor 23.

The linear tracking mechanism 50 includes the rotary plate 21, a crank shaft 24, the movement plate 25, and a rail 26, and the linear tracking mechanism 50 converts rotation movement of the rotary plate 21 into linear movement (for example, linear movement in the X axis direction) of the movement plate 25.

The crank shaft 24 transfer the rotation movement of the rotary plate 21 to the movement plate 25 to convert the rotation movement into the linear movement (for example, linear movement in the X axis direction (in the horizontal state)).

The pressure sensor 10 and the magnet 31 are disposed on the movement plate 25 (which is an example of the linear mover) and the movement plate 25 is moved via the crank shaft 24 in the linear form in the X axis direction along the rail 26 in the horizontal state by the motor 23 when the rotary plate 21 is rotated by the motor 23.

The motor control unit 22 performs control such that the pressure sensor 10 is moved linearly by rotating the rotary plate 21 at a predetermined rotation speed, as described above.

The position detection unit 32b (an example of the movement information detection unit) detects movement information of the pressure sensor 10. For example, the position detection unit 32b is, for example, a magnetic detection element such as a Hall element, and the position detection unit 32b detects a reference position of the movement plate 25 when the magnet 31 disposed on the movement plate 25 approaches and outputs a detection signal to the synchronous clock signal generation unit 33.

Next, an operation of the tilt sensor 1e according to the present embodiment will be described.

In the tilt sensor 1e according to the present embodiment, when the pressure sensor 10 is linearly moved by the movement mechanism 20b, the pressure sensor 10 outputs a periodic output signal according to a tilt of the detection target object. The synchronous clock signal generation unit 33 generates a synchronous clock signal to detect a tilt in a predetermined direction (for example, the X axis direction) according to information indicating a position of the movement plate 25 detected by the position detection unit 32b. The tilt information detection unit 40 performs synchronous detection according to the periodic output signal output via the flexible substrate 35a by the pressure sensor 10 and the synchronous clock signal, and the tilt information detection unit 40 detects the tilt information (for example, the tilt angle θ) according to a result of the synchronous detection.

The detailed operation of the tilt information detection unit 40 is the same as that of the above-described first embodiment, and thus the description thereof will be omitted here.

As described above, according to the present embodiment, the movement mechanism 20b includes the movement plate 25 (the linear mover) on which the pressure sensor 10 is disposed and the movement mechanism 20b linearly moves the pressure sensor 10 by moving the movement plate 25 in the linear form.

Thus, the tilt sensor 1e according to the present embodiment can improve the detection precision of the tilt information as in the first embodiment. Since the pressure sensor 10 outputs the periodic output signal through the linear movement, the tilt sensor 1e according to the present embodiment can simplify the process of detecting the tilt information of the detection target object using the synchronous detection.

Seventh Embodiment

Next, a tilt sensor 1f according to a seventh embodiment will be described with reference to the drawings.

Figure 12:
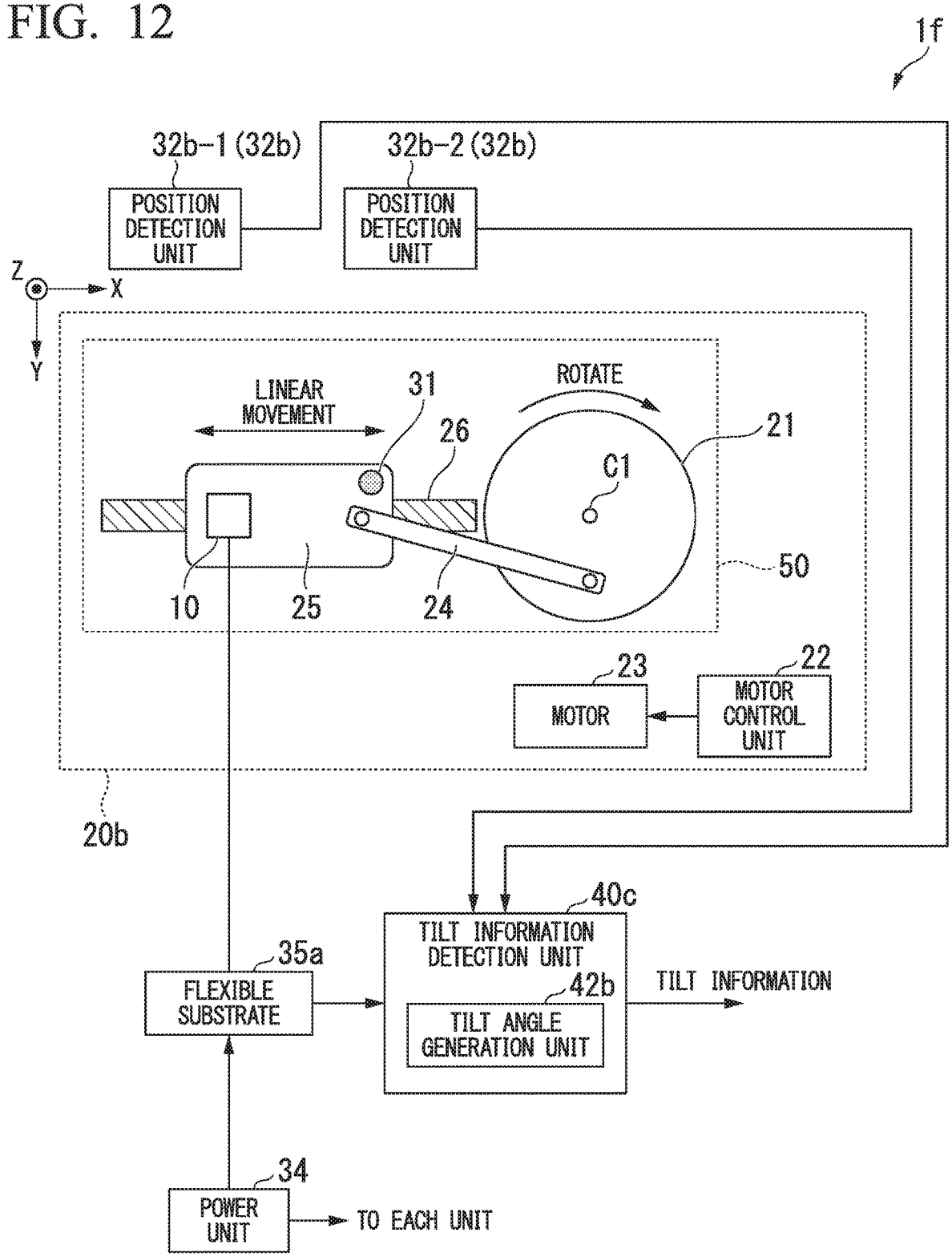
FIG. 12 is a block diagram showing an example of a tilt sensor according to a seventh embodiment.

FIG. 12 is a block diagram showing an example of the tilt sensor 1f according to the seventh embodiment.

As shown in FIG. 12, the tilt sensor 1f includes a pressure sensor 10, a movement mechanism 20b, a magnet 31, position detection units (32b-1 and 32b-2), a power unit 34, a flexible substrate 35a, and a tilt information detection unit 40c.

In FIG. 12, the same reference numerals are given to the same configuration as the configuration shown in FIG. 11, and the description thereof will be omitted.

According to the present embodiment, an example of a case when tilt information is detected according to outputs of the pressure sensor 10 at two positions to which the pressure sensor 10 is moved linearly instead of the synchronization detection according to the periodic output signal of the pressure sensor 10 will be described.

The position detection units (32b-1 and 32b-2) have the same configuration as the position detection unit 32b, and the position detection units (32b-1 and 32b-2) detect a movement position of the movement plate 25 when the magnet 31 disposed on the movement plate 25 approaches and output detection signals to the tilt information detection unit 40c. According to the present embodiment, when the position detection units (32b-1 and 32b-2) are any position detection unit included in the tilt sensor 1f or are not particularly distinguished from each other, the position detection units (32b-1 and 32b-2) will be described as the position detection units 32b.

For example, the position detection unit 32b-1 detects that the pressure sensor 10 is moved to a first position and outputs a detection signal at the first position to the tilt information detection unit 40c. For example, the position detection unit 32b-2 detects that the pressure sensor 10 is moved to a second position and outputs a detection signal at the second position to the tilt information detection unit 40c. The first position and the second position are assumed to be distant by a movement distance ΔD of the pressure sensor 10 moved in parallel to the rail 26.

The tilt information detection unit 40c detects the tilt information of the detection target object according to the movement distance of the pressure sensor 10 and a change in an output value of the pressure sensor 10 to the movement distance. For example, the tilt information detection unit 40c detects a tilt angle of the detection target object in the X axis direction according to the movement distance ΔD between the first and second positions described above and the change in the output value of the pressure sensor 10 to the movement distance ΔD. The tilt information detection unit 40c includes a tilt angle generation unit 42b.

The tilt angle generation unit 42b acquires the output value (voltage V1) of the pressure sensor 10 at the first position at which the detection signal is output by the position detection unit 32b-1. The tilt angle generation unit 42b acquires the output value (voltage V2) of the pressure sensor 10 at the second position at which the detection signal is output by the position detection unit 32b-2. The tilt angle generation unit 42b calculates a change amount ΔVo (=V2−V1) between the output value at the first position and the output value at the second position. Then, the tilt angle generation unit 42b calculates the tilt angle θ according to the movement distance ΔD and the change amount ΔVo using the above-described Expression (1). According to the present embodiment, the above-described movement distance ΔD is used instead of the movement distance (2×Rs) in Expression (1).

As described above, according to the present embodiment, the tilt information detection unit 40c detects the tilt information (for example, the tilt angle θ) of the detection target object according to the movement distance (for example, the movement distance ΔD) of the pressure sensor 10 and the change in the output value (for example, the change amount ΔVo) of the pressure sensor 10 to the movement distance.

Thus, the tilt sensor 1f according to the present embodiment can detect the tilt information with a simpler configuration than the configuration using the synchronization detection described above.

Eighth Embodiment

Next, a tilt sensor 1g according to an eighth embodiment will be described with reference to the drawings.

Figure 13:
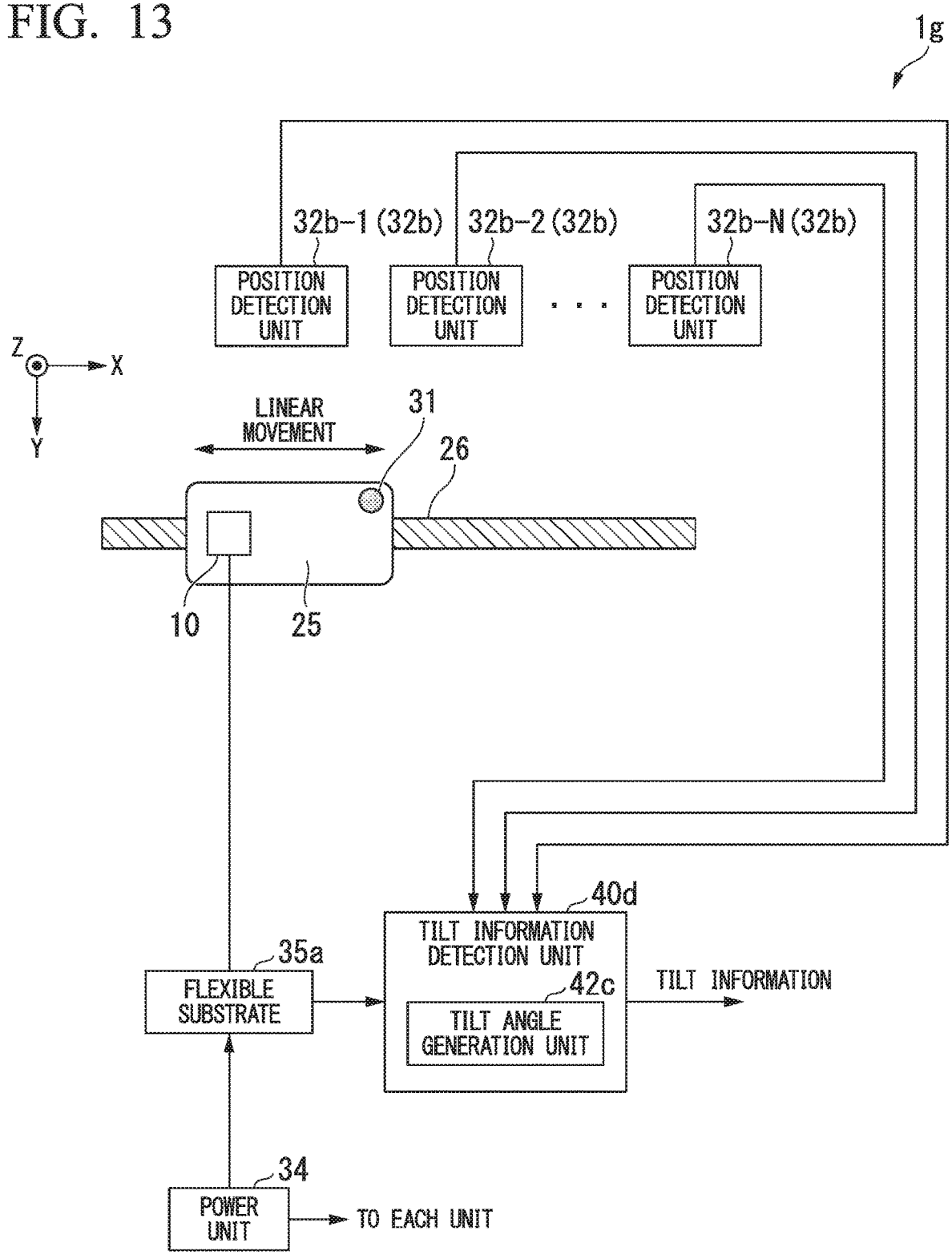
FIG. 13 is a block diagram showing an example of a tilt sensor according to an eighth embodiment.

FIG. 13 is a block diagram showing an example of the tilt sensor 1g according to the eighth embodiment.

As shown in FIG. 13, the tilt sensor 1g includes a pressure sensor 10, a movement plate 25, a rail 26, a magnet 31, position detection units (32b-1, 32b-2, . . . , and 32b-N), a power unit 34, a flexible substrate 35a, and a tilt information detection unit 40d.

In FIG. 13, the same reference numerals are given to the same configuration as the configuration shown in FIG. 12, and the description thereof will be omitted.

According to the present embodiment, another example of a case when the tilt information is detected according to outputs of the pressure sensor 10 linearly moved at two positions will be described. The present embodiment is different from the seventh embodiment in that the movement mechanism 20b is not included, the movement plate 25 with no motor 23 and the rail 26 are included, and the pressure sensor 10 is linearly moved by an external force, acceleration, or the like.

According to the present embodiment, the movement plate 25 includes the pressure sensor 10 and the magnet 31, and the movement plate 25 is configured to be linearly movable freely along the rail 26 (linear tracking). For example, the movement plate 25 is moved along the rail 26 by an external force (for example, an acceleration component in a measurement axis direction (the X axis direction)), a human force, or the like applied to the detection target object.

The position detection units (32*b*-1, 32*b*-2, . . . , and 32*b*-N) have the same configuration as the position detection unit 32*b*, and the position detection units (32*b*-1, 32*b*-2, . . . , and 32*b*-N) detect a movement position of the movement plate 25 when the magnet 31 disposed on the movement plate 25 approaches and output detection signals to the tilt information detection unit 40*d*.

According to the present embodiment, when the position detection units (32*b*-1, 32*b*-2, . . . , and 32*b*-N) are any position detection unit included in the tilt sensor 1*g* or are not particularly distinguished from each other, the position detection units (32*b*-1, 32*b*-2, . . . , and 32*b*-N) will be described as the position detection units 32*b*.

A positional relation among the position detection units (32*b*-1, 32*b*-2, . . . , and 32*b*-N) is assumed to be decided in advance. For example, the position detection units (32*b*-1, 32*b*-2, . . . , and 32*b*-N) are disposed at a predetermined position interval and a movement distance of the pressure sensor 10 can be detected in accordance with the outputs of the position detection units (32*b*-1, 32*b*-2, . . . , and 32*b*-N).

The tilt information detection unit 40*d* detects the tilt information of the detection target object according to the movement distance of the pressure sensor 10 and a change in the output value of the pressure sensor 10 to the movement distance. For example, the tilt information detection unit 40*d* detects the tilt angle of the detection target object in the X axis direction according to the movement distance $\Delta D$ obtained in accordance with outputs of two position detection units among the plurality of position detection units 32*b* described above and a change in the output value of the pressure sensor 10 with respect to the movement distance $\Delta D$. The tilt information detection unit 40*d* includes a tilt angle generation unit 42*c*.

The tilt angle generation unit 42*c* acquires the output value (voltage V1) of the pressure sensor 10 at the first position and the output value (voltage V2) of the pressure sensor 10 at the second position, the first position and the second position being positions at which the detection signals are output by two position detection units among the position detection units (32*b*-1, 32*b*-2, . . . , and 32*b*-N). The tilt angle generation unit 42*c* calculates a change amount $\Delta Vo$ (=V2−V1) between the output value at the first position and the output value at the second position. Then, the tilt angle generation unit 42*c* calculates the tilt angle θ according to the movement distance $\Delta D$ and the change amount $\Delta Vo$ using the above-described Expression (1). According to the present embodiment, the above-described movement distance $\Delta D$ is used instead of the movement distance (2×Rs) in Expression (1).

For example, when the detection signals obtained by detecting the magnet 31 within a predetermined period are output from three or more position detection units 32*b*, the tilt angle generation unit 42*c* may select two position detection units 32*b* which are most distant among the three or more position detection units 32*b* and the tilt angle generation unit 42*c* may set a distance between the most distant two position detection units 32*b* as the movement distance $\Delta D$. In this case, for example, the tilt angle generation unit 42*c* calculates the tilt angle θ according to the change amount $\Delta Vo$ at the positions of the two position detection units 32*b* which detect the magnet 31 at the most distant positions and the distance (the movement distance $\Delta D$) between the two position detection units 32*b*.

As described above, the tilt sensor 1*g* according to the present embodiment includes the movement plate 25 and the rail 26 without including the movement mechanism 20*b* according to the seventh embodiment and the tilt sensor 1*g* linearly moves the pressure sensor 10 by an external force, acceleration, or the like. Then, the tilt information detection unit 40*d* detects the tilt information (for example, the tilt angle θ) of the detection target object according to the movement distance (for example, the movement distance $\Delta D$) of the pressure sensor 10 and the change in the output value (for example, the change amount $\Delta Vo$) of the pressure sensor 10 to the movement distance.

Thus, the tilt sensor 1*g* according to the present embodiment can detect the tilt information in the simpler configuration than when the above-described synchronization detection is used.

The present invention is not limited to the foregoing embodiments and can be modified in the scope of the present invention without departing from the gist of the present invention.

For example, in the foregoing embodiment, the example in which the pressure sensor 10 is moved to output the periodic output signal and the tilt information detection unit 40 (40*a*, 40*b*) detects the tilt information according to the periodic output signal has been described, but the present invention is not limited thereto. For example, the tilt information detection unit 40 (40*a*, 40*b*) may detect the tilt angle θ using the above-described Expression (1) according to the output values of two pressure sensors 10 at two positions before and after the movement or two positions on the movement path and the distance information of the two positions as in the tilt information detection unit 40*c* (40*d*).

In the foregoing embodiments, the example in which the movement mechanism 20 (20*a*, 20*b*) includes the motor 23 and the movement mechanism 20 (20*a*, 20*b*) actively moves the pressure sensor 10 has been described, but the present invention is not limited thereto. For example, the tilt sensor 1 (1*a* to 1*f*) may not include the movement mechanism 20 (20*a*, 20*b*) as in the seventh embodiment and the pressure sensor 10 may be moved passively by a windmill, a water wheel, or a human force.

The movement path of the pressure sensor 10 is not limited to the above-described movement path and the pressure sensor 10 may be moved along another movement path.

In the foregoing embodiments, the example in which the tilt information detection unit 40 (40*a*, 40*b*) detects the change amount of the output signal of the pressure sensor 10 using the synchronization detection has been described, but the present invention is not limited thereto. For example, the tilt information detection unit 40 (40*a*, 40*b*) may use a rectifier circuit or a peak-hold circuit or may detect the change amount of the output signal of the pressure sensor 10 by a difference before and after the movement.

In the foregoing first to third embodiments, the example in which the slip ring 35 is used as signal transmission means for transmitting the output signal output from the pressure sensor 10 to the tilt information detection unit 40 has been described. For example, another means such as a rotary connector, wireless communication, or optical transmission by a photo-coupler may be used instead of the slip ring 35. As means for supplying a power voltage (supply power) to the pressure sensor 10, means such as providing a battery in a rotary connector, a wireless power supply, or the rotary plate 21 may be used instead of the slip ring 35.

In the foregoing fourth to sixth embodiments, means for supplying the above-described power voltage (supply power) and signal transmission means may be used instead of the flexible substrate 35a.

In the foregoing embodiments, the example in which the Hall element is used as the movement information detection unit (the rotation detection unit 32, the swing detection unit 32a, and the position detection unit 32b) has been described. However, instead of the Hall element, for example, a microswitch, an encoder, or an optical sensor may be used. The rotary plate 21, the swing plate 21a, or the movement plate 25 may include a movement information detection unit such as a Hall element and the magnet 31 may be disposed on a movement path of the rotary plate 21, the swing plate 21a, or the movement plate 25.

In the foregoing embodiments, the example in which the pressure sensor 10 is a difference pressure sensor has been described. For example, a pressure sensor of another scheme such as an absolute pressure sensor may be used.

In the foregoing embodiments, the example in which the tilt angle θ of the detection target object is detected as an example of the tilt information has been described, but the present invention is not limited thereto. For example, another information such as horizontality or information indicating whether the detection target object is tilted may be used. The tilt information detection unit 40 (40a, 40b) may output information indicating a result of the synchronization detection as tilt information and may perform the process of the tilt angle generation unit 42 (42a) outside of the tilt sensor 1 (1a to 1e). That is, the tilt sensor 1 (1a to 1e) may not include the tilt angle generation unit 42 (42a) and the tilt angle generation unit 42 (42a) may perform the process outside of the tilt sensor 1 (1a to 1e).

A computer system may be included inside the above-described tilt information detection unit 40 (40a, 40b, 40c, and 40d). A procedure of the process of detecting the above-described tilt information is stored in a computer-readable recording medium in a program format and the foregoing process is performed when a computer reads and executes the program. Here, the computer-readable recording medium is a magnetic disk, a magneto-optical disc, a CD-ROM, a DVD-ROM, or a semiconductor memory. The computer program may be transmitted to a computer via a communication line and the computer receiving the transmitted computer program may execute the computer program.

Some or all of the functions of the above-described tilt information detection unit 40 (40a, 40b, 40c, and 40d) may be realized as an integrated circuit of a large scale integration (LSI) or the like. Each of the above-described functions may be individually realized as a processor or some or all of the functions may be integrated and realized as processors. An integrated circuit forming scheme is not limited to the LSI, but may be realized by a dedicated circuit or a general-purpose processor. When an integrated circuit forming technology with which the LSI is substituted with an advance of semiconductor technologies appears, an integrated circuit by the technology may be used.

Some or all of the functions of the above-described tilt information detection unit 40 (40a, 40b, 40c, and 40d) may be realized as simple circuits using a discrete component (for example, a single-function component or a simplex element) such as a comparator.

REFERENCE SIGNS LIST 1, 1a, 1b, 1c, 1d, 1e, 1f, 1g Tilt sensor
2 Detection target object
10, 11, 12, 13, 14 Pressure sensor
20, 20a, 20b Movement mechanism
21 Rotary plate
21a Swing plate
22 Motor control unit
23 Motor
24 Crank shaft
25 Movement plate
26 Rail
31 Magnet
32 Rotation detection unit
32a Swing detection unit
32b, 32b-1, 32b-2, 32b-N Position detection unit
33, 33a Synchronous clock signal generation unit
34 Power unit
35 Slip ring
35a Flexible substrate
40, 40a, 40b, 40c, 40d Tilt information detection unit
41, 41a Synchronization detection unit
42, 42a, 42b, 42c Tilt angle generation unit
43, 43a Difference generation unit
50 Linear tracking mechanism

The invention claimed is:

1. A tilt sensor comprising:
a pressure sensor disposed to be relatively movable with respect to a detection target object and configured to detect pressure of a fluid; and
a tilt information detection unit configured to detect tilt information of the detection target object according to an output of the pressure sensor and movement information of the pressure sensor.

2. The tilt sensor according to claim 1, further comprising:
a movement mechanism configured to move the pressure sensor relative to the detection target object along a predetermined movement path,
wherein the tilt information detection unit detects the tilt information of the detection target object according to the output of the pressure sensor and the movement information of the pressure sensor moved along the predetermined movement path by the movement mechanism.

3. The tilt sensor according to claim 2,
wherein the movement mechanism includes a rotator on which the pressure sensor is disposed, and the movement mechanism moves the pressure sensor in a circular form by rotating the rotator.

4. The tilt sensor according to claim 2,
wherein the movement mechanism includes a rotator on which the pressure sensor is disposed, and the movement mechanism moves the pressure sensor in an arc form by rotating the rotator.

5. The tilt sensor according to claim 2,
wherein the movement mechanism includes a linear mover on which the pressure sensor is disposed and which is capable of moving in a linear form, and the movement mechanism moves the pressure sensor in the linear form by moving the linear mover.

6. The tilt sensor according to claim 2,
wherein the tilt information detection unit performs synchronization detection according to a periodic output signal output from the pressure sensor moved along the predetermined movement path and a reference signal which is according to the movement information, and the tilt information detection unit detects the tilt information of the detection target object according to a result of the synchronization detection.

7. The tilt sensor according to claim 6, further comprising:
a reference signal generation unit configured to generate the reference signal corresponding to a tilt in a predetermined direction according to the movement information,
wherein the tilt information detection unit performs the synchronization detection according to the reference signal generated by the reference signal generation unit and the periodic output signal output from the pressure sensor, and the tilt information detection unit detects the tilt information of the detection target object in the predetermined direction according to the result of the synchronization detection.

8. The tilt sensor according to claim 1,
wherein a plurality of pressure sensors are included, and
wherein the tilt information detection unit detects the tilt information of the detection target object according to outputs of the plurality of pressure sensors and the movement information of the pressure sensors.

9. The tilt sensor according to claim 8,
wherein two of the pressure sensors are disposed to output periodic output signals with mutually reversed phases due to a predetermined movement, and
wherein the tilt information detection unit detects the tilt information of the detection target object according to the two output signals with the mutually reversed phases and the movement information of the pressure sensors.

10. The tilt sensor according to claim 8,
wherein two of the pressure sensors are disposed to output periodic output signals with phases mutually deviated by 90 degrees due to a predetermined movement, and
wherein the tilt information detection unit detects the tilt information of the detection target object according to the two output signals with the phases deviated by 90 degrees and the movement information of the pressure sensor.

11. The tilt sensor according to claim 1,
wherein the tilt information detection unit detects the tilt information of the detection target object according to a movement distance of the pressure sensor and a change in an output value of the pressure sensor with respect to the movement distance.

12. The tilt sensor according to claim 1, further comprising:
a movement information detection unit configured to detect the movement information of the pressure sensor.

* * * * *